(12) United States Patent
Yokoyama

(10) Patent No.: US 8,228,514 B2
(45) Date of Patent: Jul. 24, 2012

(54) INFORMATION PROCESSING APPARATUS, DATA PROCESSING METHOD, AND COMPUTER READABLE MEDIUM STORING PRINT CONTROL PROGRAM FOR PERFORMING DATA PROCESSING METHOD FOR TRANSMITTING BITMAP DATA TO AN IMAGE FORMING APPARATUS

(75) Inventor: Noboru Yokoyama, Adachi-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1218 days.

(21) Appl. No.: 11/152,565

(22) Filed: Jun. 14, 2005

(65) Prior Publication Data

US 2005/0275869 A1 Dec. 15, 2005

(30) Foreign Application Priority Data

Jun. 15, 2004 (JP) .................. 2004-176467

(51) Int. Cl.
G06F 3/12 (2006.01)
G06K 15/00 (2006.01)
(52) U.S. Cl. ............. 358/1.13; 358/1.15; 358/1.16; 358/1.18
(58) Field of Classification Search .............. None
See application file for complete search history.

(56) References Cited

U.S. PATENT DOCUMENTS

| | | | |
|---|---|---|---|
| 5,836,579 A | | 11/1998 | Hayashi et al. |
| 6,307,637 B1 * | | 10/2001 | Kujirai .................. 358/1.11 |
| 6,614,546 B1 * | | 9/2003 | Kurozasa ............... 358/1.15 |
| 6,739,772 B2 | | 5/2004 | Suzuki et al. |
| 7,586,639 B2 * | | 9/2009 | Nakata .................... 358/1.6 |
| 2003/0142337 A1 * | | 7/2003 | Kizaki et al. .......... 358/1.13 |
| 2004/0047643 A1 * | | 3/2004 | Jackelen et al. ......... 399/81 |
| 2004/0101326 A1 * | | 5/2004 | Hoene et al. ............ 399/77 |
| 2004/0107854 A1 | | 6/2004 | Nakatani et al. |
| 2004/0114954 A1 * | | 6/2004 | Ohtani .................... 399/82 |
| 2005/0162669 A1 * | | 7/2005 | Park et al. ............... 358/1.1 |

FOREIGN PATENT DOCUMENTS

| | | |
|---|---|---|
| JP | 8-212022 A | 8/1996 |
| JP | 11-147663 A | 6/1999 |
| JP | 2001-337798 A | 12/2001 |
| JP | 2001-337799 A | 12/2001 |
| JP | 2002-144607 A | 5/2002 |
| JP | 2002-331730 A | 11/2002 |
| JP | 2002-358189 A | 12/2002 |
| KR | 135065 | 4/1998 |
| KR | 2000-21078 | 12/2000 |

* cited by examiner

*Primary Examiner* — Vincent Rudolph
(74) *Attorney, Agent, or Firm* — Canon U.S.A., Inc., IP Division

(57) ABSTRACT

An information processing apparatus includes: a storage unit storing a maximum acceptable number of sheets of recording paper that can be processed by a post processing apparatus; a post process setting unit setting a predetermined post process to be performed by using the post processing apparatus; a generating unit generating bitmap data in units of physical pages based on logical page data; a transmitting unit transmitting the generated bitmap data to an image forming apparatus; a determining unit determining whether the post process can be performed based on the number of physical pages generated from the logical page data and the maximum acceptable number if setting has been done so as to perform the predetermined post process on the logical page data; and a control unit controlling a bitmap data generating process performed by the generating unit and a bitmap data transmitting process performed by the transmitting unit based on the determination made by the determining unit.

9 Claims, 18 Drawing Sheets

FIG. 7

| SELECTION OF PROCESS |
|---|

WARNING

Impossible to do stapling because the number of sheets exceeds the maximum.

Size of Paper :     A4 ▼

Number of Copies :     1 ▲▼

Paper Feeder :     Cassette 1 ▼

Layout :     1 page/sheet ▼

○ Duplex     ● Staple

To continue printing without stapling, push "Continue printing"
To print with different setting, push "Reprinting"
To cancel printing, push "Cancel printing"

| Continue printing | Reprinting | Cancel printing |
|---|---|---|
| B31 | B32 | B33 |

FIG. 12

| SELECTION OF PROCESS |

WARNING

Impossible to do stapling because the number of sheets exceeds the maximum.

Current setting : 1 page/sheet (single-sided)

- ◯ 2 pages/sheet (single-sided)
- ◯ 4 pages/sheet (single-sided)
- ◯ 6 pages/sheet (single-sided)
- ◯ 8 pages/sheet (single-sided)

- ◯ 1 page/side (Duplex)
- ● 2 pages/side (Duplex)
- ◯ 4 pages/side (Duplex)
- ◯ 6 pages/side (Duplex)
- ◯ 8 pages/side (Duplex)

To continue printing without stapling, push "Continue printing"
To change layout, push "Change layout"
To cancel printing, push "Cancel printing"

| Continue printing | Change layout | Cancel printing |

B31　　　　　B32　　　　　B33

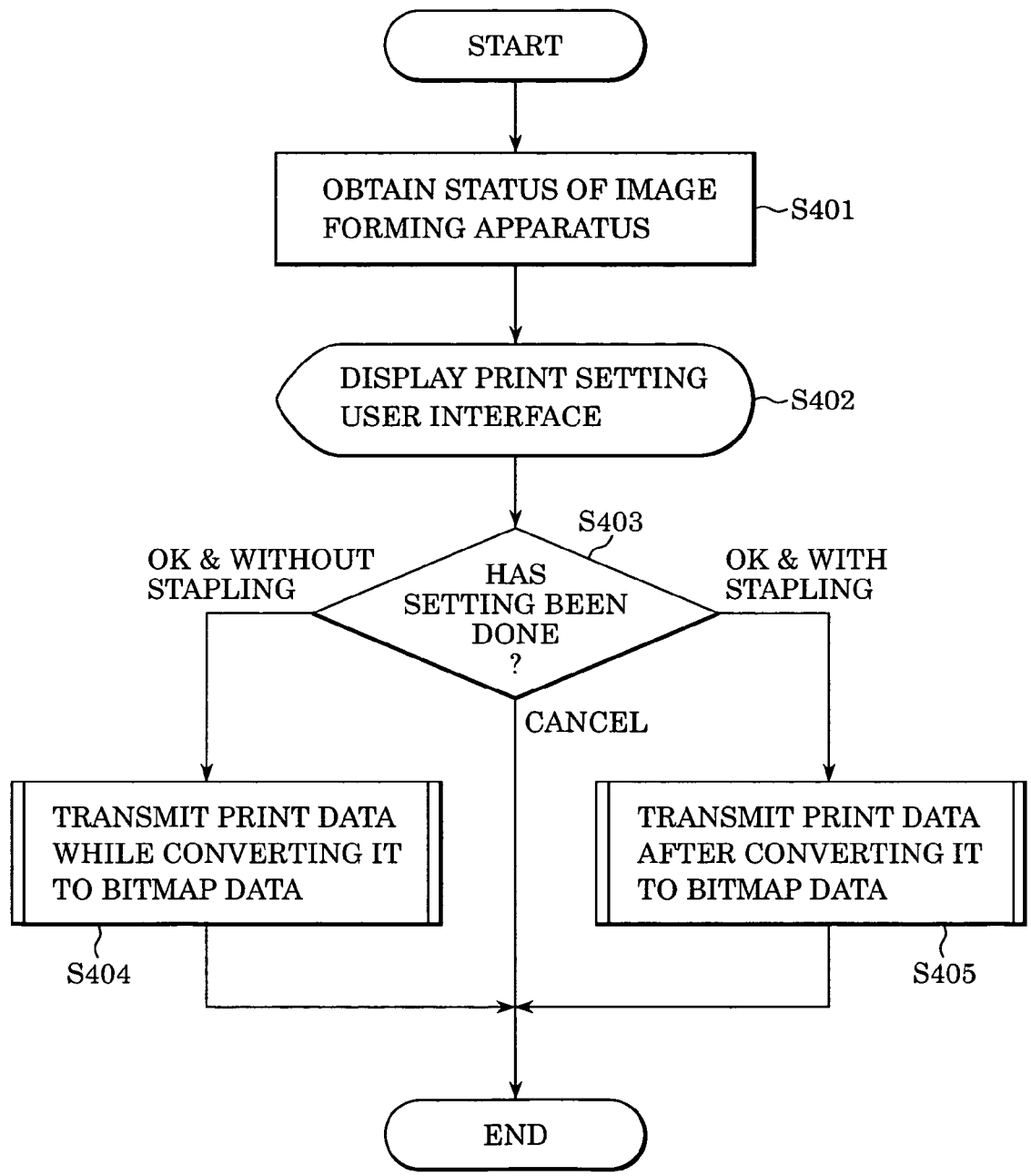

FIG. 18

| DIRECTORY INFORMATION |
|---|
| FIRST DATA PROCESSING PROGRAM<br>PROGRAM CODE GROUP CORRESPONDING TO STEPS OF FLOWCHART SHOWN IN FIG. 2 |
| SECOND DATA PROCESSING PROGRAM<br>PROGRAM CODE GROUP CORRESPONDING TO STEPS OF FLOWCHART SHOWN IN FIGS. 8 AND 9 |
| THIRD DATA PROCESSING PROGRAM<br>PROGRAM CODE GROUP CORRESPONDING TO STEPS OF FLOWCHART SHOWN IN FIGS. 10 AND 11 |
| FOURTH DATA PROCESSING PROGRAM<br>PROGRAM CODE GROUP CORRESPONDING TO STEPS OF FLOWCHART SHOWN IN FIG. 14 |
| FIFTH DATA PROCESSING PROGRAM<br>PROGRAM CODE GROUP CORRESPONDING TO STEPS OF FLOWCHART SHOWN IN FIG. 15 |
| SIXTH DATA PROCESSING PROGRAM<br>PROGRAM CODE GROUP CORRESPONDING TO STEPS OF FLOWCHART SHOWN IN FIG. 16 |
| SEVENTH DATA PROCESSING PROGRAM<br>PROGRAM CODE GROUP CORRESPONDING TO STEPS OF FLOWCHART SHOWN IN FIG. 17 |

# INFORMATION PROCESSING APPARATUS, DATA PROCESSING METHOD, AND COMPUTER READABLE MEDIUM STORING PRINT CONTROL PROGRAM FOR PERFORMING DATA PROCESSING METHOD FOR TRANSMITTING BITMAP DATA TO AN IMAGE FORMING APPARATUS

BACKGROUND OF THE INVENTION

1. Field of the Invention

The present invention relates to an information processing apparatus, a data processing method, and a print control program for transmitting bitmap data, which is generated by converting print information, through a printer driver to an image forming apparatus to which an apparatus for performing a predetermined post process can be connected.

2. Description of the Related Art

In a conventional language-based printing system, a printer driver in a host computer generates data described in a page description language, such as PostScript®, based on data to be printed and transmits the generated data to a printer. The printer converts the received print data described in the page description language to bitmap data and prints it. In order to convert the print data to bitmap data at high speed, which needs a high performance, a CPU of a high operating frequency and dedicated hardware are used.

On the other hand, in a host-based printing system, a printer driver in a host computer generates bitmap data in the host computer based on data to be printed and transmits the bitmap data to a printer.

Then, the printer prints the received bitmap data. At this time, in order to reduce an amount of data transferred from the host computer to the printer, the bitmap data is compressed in the host computer and is decompressed in the printer. Since conversion to bitmap data, which requires a high performance, is performed on the host computer side, a controller of the host-based printing system can be simply configured and the price thereof can be reduced.

Hitherto, a post-print processing apparatus represented by a stapler has not been installed in a host-based printer, which operates at a lower speed than a language-based printer.

In recent years, however, an improvement in a processing ability of host computers has enabled a higher-speed conversion to bitmap data. Accordingly, it is now possible to realize a satisfying printing environment with a host-based printing system.

Further, when considering a demand of the market for an enhanced productivity, a host-based printer provided with a stapler has considerable future promise.

Japanese Patent Laid-Open No. 8-212022 discloses the following technique. That is, when print data to be stapled is transmitted from a printer driver installed in a computer, a printer that receives the print data detects the number of sheets to be finally output therefrom and determines whether the detected number of sheets is equal to or smaller than a predetermined number. If the detected number is equal to or smaller than the predetermined number, instructions of stapling or sorting from the printer driver are canceled.

Also, the above-mentioned patent document discloses that the printer driver includes a unit for detecting the number of pages of a document to be output and a unit for canceling a printing instruction when the detected number of pages is equal to or smaller than a predetermined number.

The printer disclosed in this patent document uses a scheme of receiving data described in a page description language and expanding it to image data in the printer side. In other words, the printing system disclosed in this patent document is not host-based.

On the other hand, Japanese Patent Laid-Open No. 2002-144607 discloses the following technique. First, a device counts the number of sheets to be printed out. Then, a device controller compares the counted number with a maximum acceptable number to be processed that is set in advance in a stapler provided in the device. As a result of the comparison, if it is determined that the number of sheets to be printed out exceeds the maximum acceptable number, the device controller automatically cancels a stapling operation instructed by a user so that an ordinary output process is performed.

In a conventional printing system including an information processing apparatus and a printer or the like, particularly in a printer which performs a printing operation based on a page description language, data described in a page description language transmitted from a host computer is converted to bitmap data in units of pages in the printer, and pieces of the converted page data are sequentially printed out. Therefore, if the number of sheets of print data to be stapled exceeds a capacity of a stapler, a user cannot provide instructions in an interactive manner. As a result, the conventional printer ignores the instructions of stapling from the user and prints the entire data, as described in Japanese Patent Laid-Open No. 2002-144607.

The printer driver is capable of specifying the number of sheets for recording page data created in an application. However, as in duplex printing, when an instruction of laying a plurality of pages on one sheet of paper is given, the printer driver cannot specify the number of sheets to be actually output. As a result, as in the control method disclosed in Japanese Patent Laid-Open No. 2002-144607, the printer specifies the number of sheets to be printed and compares the number of sheets with the maximum acceptable number set in the stapler.

In this method, if the number of sheets to be printed exceeds the maximum, a stapling process desired by the user is ignored. When the user wants a printer to staple large numbers of copies, if the printer outputs printed sheets of paper while ignoring the desire or setting of the user, the user is forced to manually sort and staple the sheets. This causes a significant decrease in usability.

It is possible to construct a host-based printing system including a stapler. In this system, however, the above-described case can of course occur, that is, the number of printed sheets to be stapled by a stapler in a host-based printer can exceed the capacity of the stapler.

In this system, the above-described problem which occurs in a language-based printer also occurs if stapling is canceled when the number of sheets to be output exceeds the maximum acceptable number. That is, in a printing operation using a host-based printing system, a user cannot perform an optimal stapling only by applying the control method according to Japanese Patent Laid-Open No. 2002-144607 to the host-based printing system.

However, the host-based printing system has a characteristic configuration in which a printer driver of a host computer generates bitmap data to be printed on one side of a sheet (that is, physical page data) and transmits the bitmap data to a printer. In other words, the number of sheets to be printed can be specified by the host computer, which cannot be realized in a conventional printing method based on a page description language.

SUMMARY OF THE INVENTION

The present invention provides a user-friendly printing system including a host-based printer provided with a sheet processing apparatus, such as a stapler. The present invention makes full use of a characteristic configuration of a host-based system and solves the above-described problems that are difficult to solve in the conventional page description language-based printing system.

According to an aspect of the present invention, there is provided an information processing apparatus transmitting bitmap data to an image forming apparatus connectable with a post processing apparatus performing a predetermined post process on recording paper on which an image is formed. The information processing apparatus includes: a storage unit storing a maximum acceptable number of sheets of recording paper that can be processed by the post processing apparatus; a post process setting unit setting the predetermined post process to be performed by using the post processing apparatus; a generating unit generating bitmap data in units of physical pages based on logical page data; a transmitting unit transmitting the bitmap data generated by the generating unit to the image forming apparatus; a determining unit determining whether the post process can be performed based on the number of physical pages generated from the logical page data and the maximum acceptable number stored in the storage unit if setting has been done so as to perform the predetermined post process on the logical page data; and a control unit controlling a bitmap data generating process performed by the generating unit and a bitmap data transmitting process performed by the transmitting unit based on the determination made by the determining unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 shows an example of the process selecting screen displayed on the display device shown in FIG. 1.

FIG. 12 shows an example of a process selecting screen displayed on the display device shown in FIG. 1.

FIG. 17 is a flowchart showing an example of another data processing procedure performed in the information processing apparatus of the present invention.

FIG. 18 shows a memory map of a storage medium for storing various data processing programs which can be read by the information processing apparatus of the present invention.

DESCRIPTION OF THE EMBODIMENTS

Figure 1:
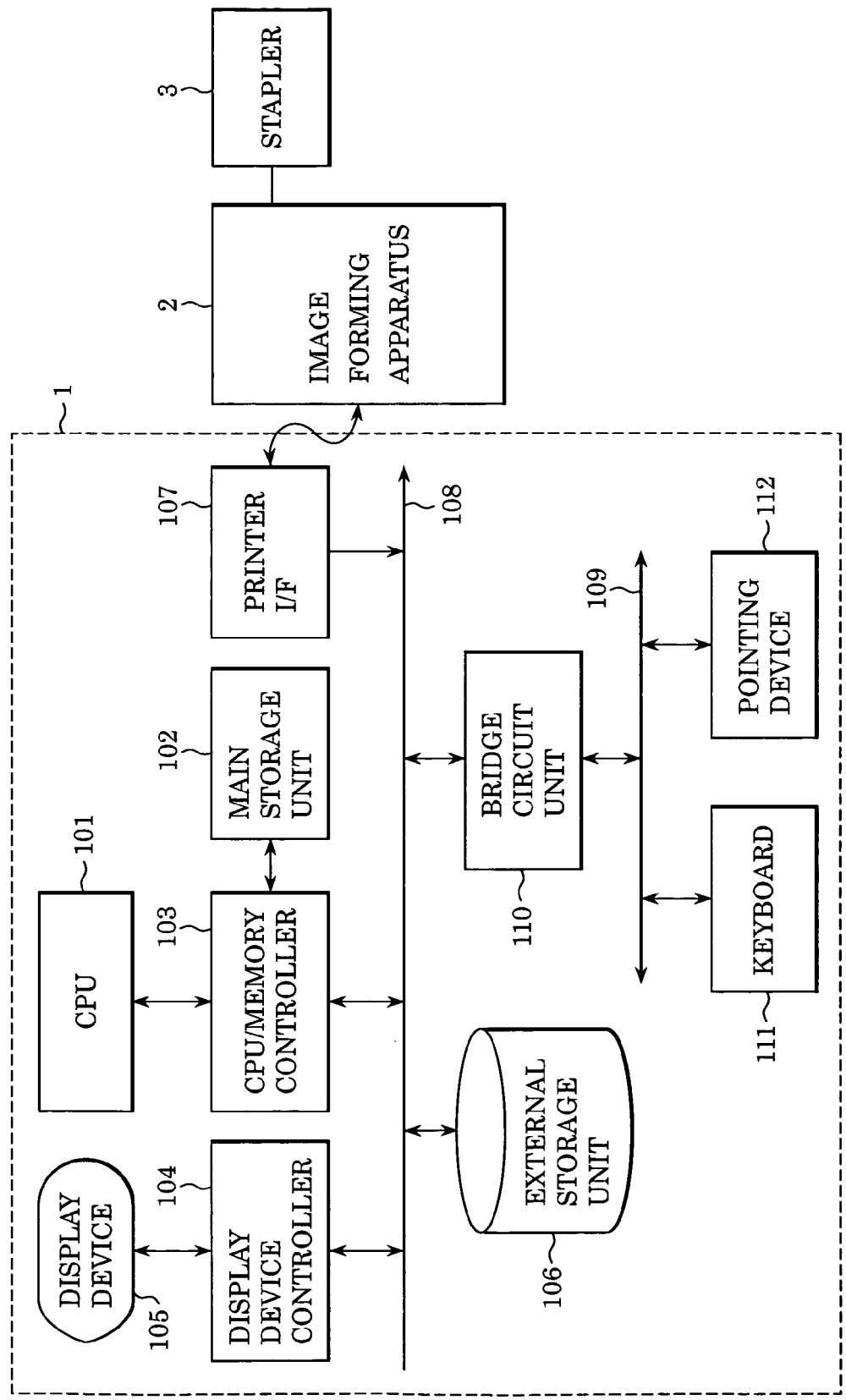
FIG. 1 is a block diagram showing an example of a printing system to which an information processing apparatus according to the present invention.

Hereinafter, embodiments of the present invention will be described with reference to the drawings.
<First Embodiment>
FIG. 1 is a block diagram showing an example of a printing system which applies an information processing apparatus according a first embodiment of the present invention. This printing system corresponds to the above-described host-based printing system, in which a host computer provided with a printer driver generates bitmap data to be printed by an image forming apparatus (e.g., a printer) and transfers the bitmap data to the printer.

In FIG. 1, the printing system includes a host computer 1, which converts print data to bitmap data and transmits the bitmap data to an image forming apparatus 2, which receives the bitmap data from the host computer 1 and prints the bitmap data.

The printing system also includes a stapler 3 serving as a sheet processing apparatus. The stapler 3 connects to the image forming apparatus 2 and staples a set of sheets printed by the image forming apparatus 2. The stapler 3 is not the essence the present invention, and thus a description thereof will be omitted.

In this embodiment, the stapler 3 is used as a sheet processing apparatus. However, the present invention is not limited to the stapler, but any apparatus may be adopted as long as a limit of the number of sheets to be processed can be set thereto.

An internal configuration of the host computer 1 is described next. A central processing unit (CPU) 101 is a control unit for controlling the host computer 1 and performing operations. The CPU 101 is capable of loading a print control program related to a data processing method for carrying out the present invention into a main storage unit 102 (described later) and operating the program. The main storage unit 102 includes a random access memory (RAM) or the like. A CPU/memory controller 103 controls the CPU 101 and the main storage unit 102. A display device controller 104 controls a display device 105 and is represented by, for example, a graphics card.

The display device 105 is a cathode ray tube (CRT) display or a liquid crystal display (LCD) or the like. An external storage unit 106 is a hard disk or the like. The external storage unit 106 stores, for example, an application program operating in the host computer 1, data used in the application, and data created by the printer driver or a user.

A printer interface (I/F) 107 is a transmitting unit for transmitting bitmap data. A high-speed external bus 108 is a connecting unit for connecting the CPU 101 to the CPU/memory controller 103, the display device controller 104, the external storage unit 106, the printer I/F unit 107, and so on.

A low-speed external bus 109 is used for connecting low-speed devices. A bridge circuit unit 110 connects the high-speed external bus 108 to the low-speed external bus 109. A keyboard 111 and a pointing device 112 serve as an interface for instructions input by a user. The keyboard 111 and the pointing device 112 are used when a user inputs characters or provides instructions to an application.

The hardware configuration of the host computer 1 may be different in a configuration of a bus depending on its architecture, but that is not essential to the present invention. Incidentally, some of actual host computers include more input/output units and functional blocks, but those unnecessary to the present invention are omitted in this embodiment.

When a user provides instructions to start an application of a word processor or a spreadsheet by using the keyboard 111 or the pointing device 112, a corresponding program and necessary data stored in the external storage unit 106 are read and written in the main storage unit 102. Then, the CPU 101 executes the program.

The user operates the keyboard 111 and the pointing device 112 while viewing the display device 105, so as to create a desired document or a table. While the user is creating the document or table, the application program receives signals from the keyboard 111 and the pointing device 112 and appropriately controls the display device controller 104. When the user selects "store" from a menu of the application program, the created document or table can be temporarily stored in the external storage unit 106, in such a manner that they can be read again as necessary.

Typically, when the user wants to print the document information or the table information, he/she selects "print" from the menu of the application program by operating the keyboard 111 or the pointing device 112. The application program starts the printer driver upon selection of "print". Herein, "starts" means to write a printer driver program from the external storage unit 106 into the main storage unit 102 and to execute it.

Figure 2:
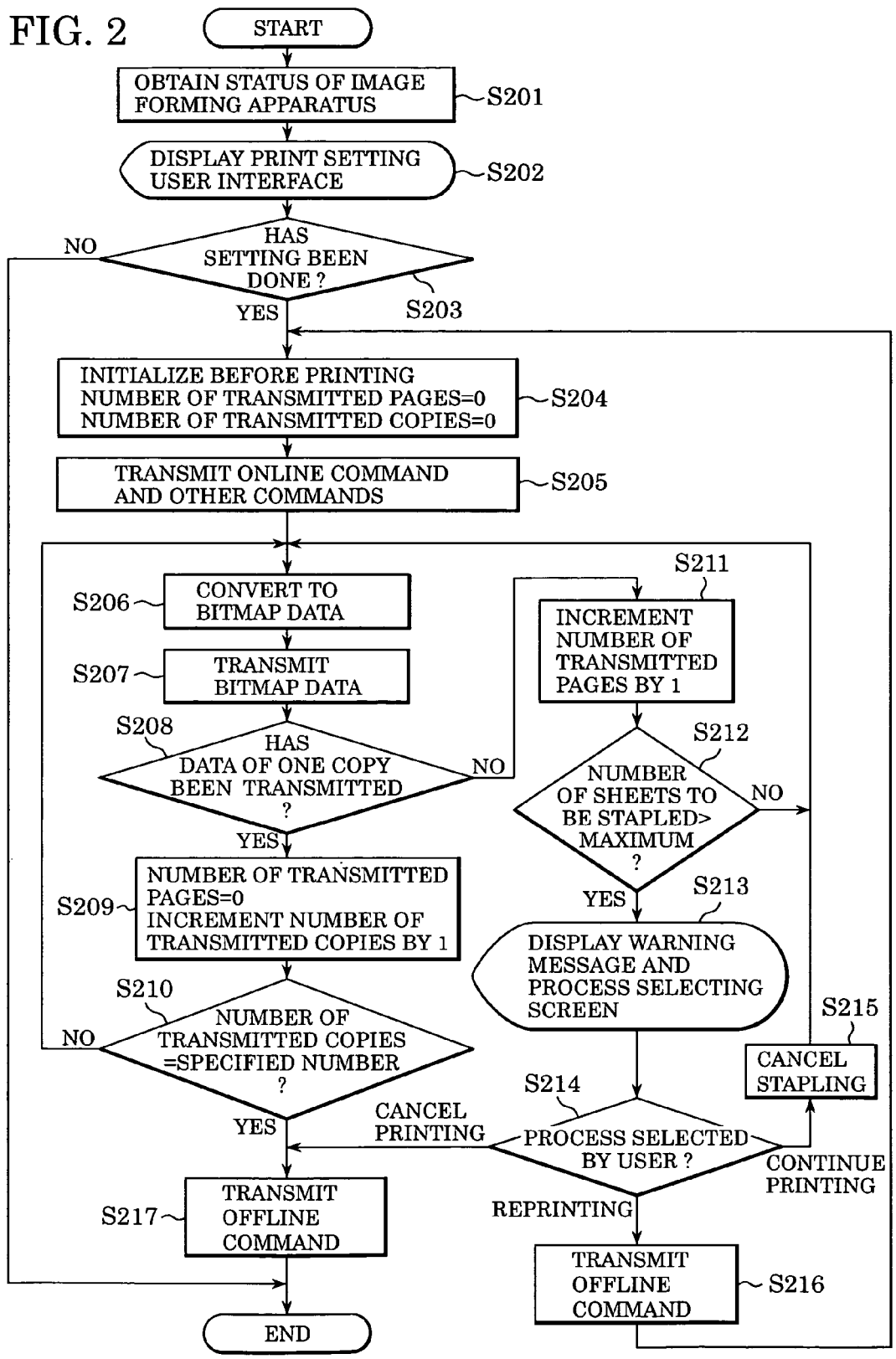
FIG. 2 is a flowchart showing an example of a data processing procedure performed in the information processing apparatus of the present invention.

FIG. 2 is a flowchart showing an example of a first data processing procedure performed in the information processing apparatus of the present invention. This flowchart corresponds to a data processing procedure stored in the external storage unit 106 shown in FIG. 1 and performed by the printer driver. The following process is performed by the printer driver in conjunction with an operating system and each function of the host computer.

First, after the printer driver has started, the printer driver obtains a status of the image forming apparatus 2 by communicating with a controller in the image forming apparatus 2 through the printer I/F 107 and stores the obtained information in a storage area in the main storage unit 102 or the external storage unit 106 (step S201). Herein, the status of the image forming apparatus 2 is information including the type of the image forming apparatus 2, whether an optional apparatus (including a sheet processing apparatus such as a stapler) is provided therein, and an upper limit of recording sheets (maximum acceptable number of sheets) that can be processed in the optional apparatus. In this embodiment and the following embodiments, the number of recording sheets that can be processed is obtained and then various processes are executed based on the information. However, the information is not limited to the number of recording sheets. For example, the number of pages can be used instead of the number of recording sheets. The number of pages can be obtained by multiplying the number of recording sheets by 2. Alternatively, the data amount (i.e., memory size) of recording sheets may be used instead of the number.

The status of the image forming apparatus 2 should be obtained and stored upon starting the printer driver to execute printing so that the latest status can be obtained. However, the present invention is not necessarily limited by timing of obtaining the status of the image forming apparatus 2.

In the above description, the printer driver obtains the status of the image forming apparatus 2 by communicating therewith. Alternatively, the user may set the status to the printer driver, and the printer driver may store the status.

In many cases, the printer driver is compatible with a plurality of types of image forming apparatuses. In that case, a print setting user interface (described later) may need to be changed in accordance with a type of image forming apparatus.

For example, assume that an image forming apparatus can perform duplex printing and that another image forming apparatus cannot perform duplex printing. In this case, in a print setting user interface for the image forming apparatus that cannot perform duplex printing, a setting item for duplex printing is not displayed. Alternatively, if the setting item is displayed, selection thereof is prohibited.

If adaptable sizes of paper differ in each image forming apparatus, the print setting user interface allows the user to select only the adaptable size of paper. Also, even in one image forming apparatus, the print setting user interface is changed in accordance with an existence of an optional apparatus if another function is added by attaching an optional apparatus.

The printer driver controls the display device controller 104 to allow the display device 105 to display a screen on which the user sets print conditions, while considering the status of the image forming apparatus 2 obtained from the image forming apparatus 2 (step S202). Then, the user sets print conditions on this screen (step S203).

Figure 3:
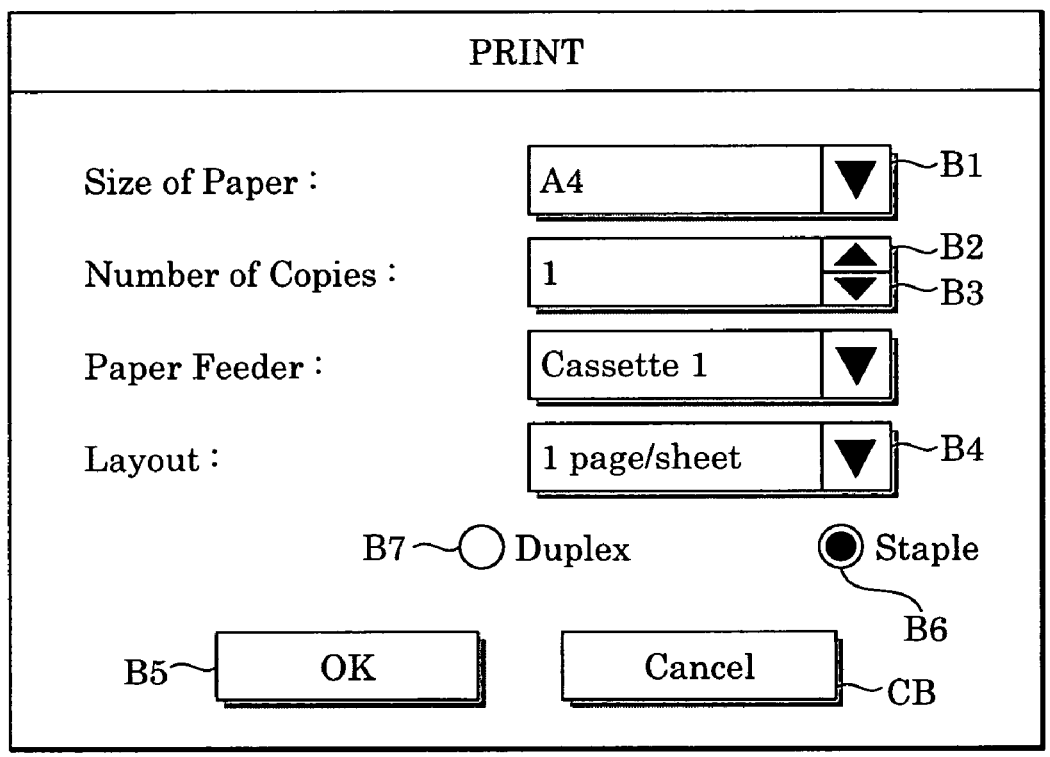
FIG. 3 shows an example of a first print setting user interface displayed on a display device shown in FIG. 1.
Figure 4A:
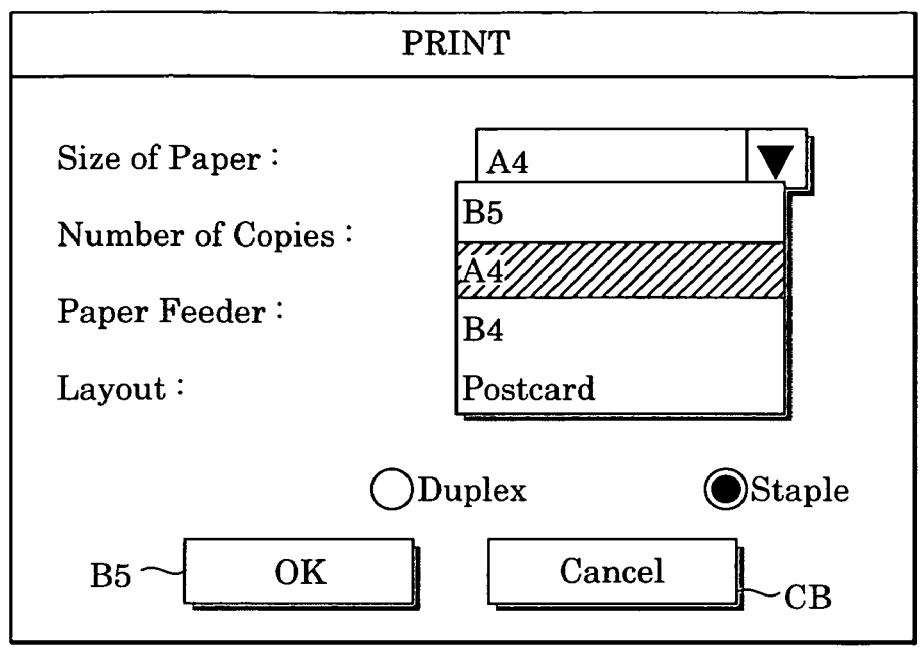
FIGS. 4A and 4B show examples of the first print setting user interface displayed on the display device shown in FIG. 1.
Figure 4B:
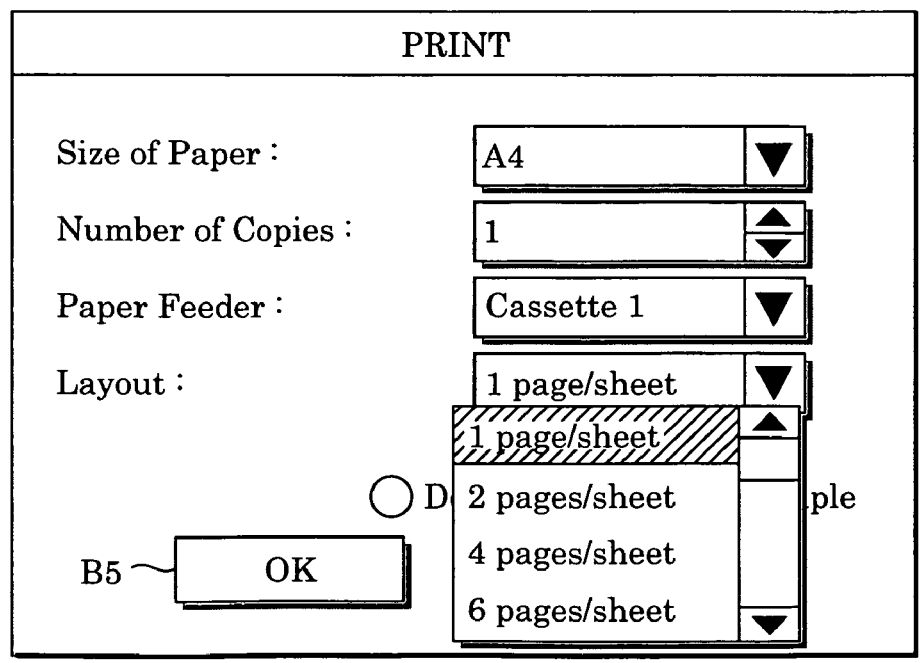

FIG. 3 and FIGS. 4A and 4B show examples of a first print setting user interface displayed on the display device 105 shown in FIG. 1. This screen functions as a user interface (UI) of the printer driver.

Referring to FIG. 3, the user can set print conditions by operating the keyboard 111 and the pointing device 112 shown in FIG. 1. For example, in order to set a size of paper, the user pushes a paper size button B1 with an inversed triangle at the right end of "Size of Paper" on the setting user interface (moves a cursor, which indicates a position on the display device 105 and which can be moved by the pointing device 112, and pushes a button on the pointing device 112). With this operation, sizes of paper which can be selected are displayed on the display device 105, as shown in FIG. 4A. Then, the user selects a desired size from among the displayed sizes (moves the cursor to a desired size and pushes the button on the pointing device 112).

After the size of paper has been selected, a list of selectable sizes disappears and display of "Size of Paper" is updated.

When the user wants to set the number of copies as a printing condition, he/she pushes an increase number of copies button B2 with an upward triangle at the right end of "Number of Copies" to increase the number or a decrease number of copies button B3 with a downward triangle to decrease the number. Alternatively, the user may set the number of copies by inputting a desired number directly from the keyboard 111.

When the user wants to set a layout, he/she pushes a layout button B4 with an inversed triangle at the right end of "Layout". Accordingly, a list of selectable layouts appears on the screen under control by the display device controller 104, as shown in FIG. 4B.

A duplex button B7 and a staple button B6 are provided so that the user can check the appropriate button or buttons on the setting user interface when duplex printing and/or stapling are desired.

If the user wants to cancel a printing operation during the setting, the printing operation can be canceled by pushing a cancel button CB on the setting user interface. Accordingly, the operating system of the host computer hides the setting user interface of the printer driver (no in step S203) so as to end the process.

If the user completes the print setting and wants to start printing, he/she pushes an OK button B5 on the setting user interface by operating the pointing device 112 (yes in step S203). Accordingly, the printer driver starts printing. Then, the process proceeds to step S204.

After the printer driver has started printing, the printer driver initializes each parameter, for example, sets a variable which indicates the number of pieces of transmitted page data which is stored in the main storage unit 102 to 0 (zero) and sets a variable which indicates the number of transmitted copies to 0 (zero) (step S204).

Then, the printer driver transmits an online command to the image forming apparatus 2 in order to establish a connection between the host computer 1 and the image forming apparatus 2. Also, the printer driver transmits commands for various conditions set on the setting user interface shown in FIG. 3 (step S205). For example, commands for notifying the printer of setting information, such as a command of specifying a paper feeder and a command of setting stapling, need to be transmitted. These commands may be transmitted before transmitting print data or may be transmitted as a header of print data. When plural copies of print data are to be output, the commands may be transmitted every time one copy of print data is transmitted. A manner of transmitting the commands regarding the print settings is not specified, but the commands should be transmitted before data to be printed.

Then, the printer driver converts print data, for example, data created by an application, to bitmap data by a RIP (raster image processor) in accordance with the print conditions set by the user on the print setting user interface shown in FIG. 3 (step S206). Then, the printer driver transmits the bitmap data to the image forming apparatus 2 (S207). The bitmap data is generated such that the conditions set on the user interface shown in FIG. 4B are reflected. For example, when a setting is done so that data of two pages is laid on one side of a recording sheet, transmitted bitmap data is laid out based on the data of two pages and is generated as a piece of page data to be printed on one side of a recording sheet. In other words, each piece of generated physical page data is equivalent to data of one physical page to be printed on one side of a recording sheet. Therefore, even when logical page data generated by an application is equivalent to ten pages, five pieces of physical page data are generated if two logical pages are laid on one side of a recording sheet.

Then, the printer driver determines whether the bitmap data generated by the RIP of one copy has been transmitted (step S208). If the printer driver determines in step S208 that bitmap data of one copy has been completely transmitted to the image forming apparatus 2, the variable (stored in the main storage unit 102) indicating the number of transmitted pages is set to 0 (zero) and the variable (stored in the main storage unit 102) indicating the number of transmitted copies of bitmap data generated by RIP is incremented (step S209). Then, the printer driver determines whether the number of copies of bitmap data transmitted to the image forming apparatus 2 has reached a specified number (step S210). If the number has not reached the specified number, the process returns to step S206 and repeats the operation until reaching the specified number. If the number of transmitted copies has reached the specified number, the printer driver transmits an offline command to the image forming apparatus 2 (step S217) in order to disconnect the host computer 1 and the image forming apparatus 2 and to end the process.

On the other hand, if in step S208 the printer driver determines that the bitmap data of one copy has not been completely transmitted, the process proceeds to step S211.

In step S211, the printer driver increments a variable (stored in the main storage unit 102) indicating the number of pieces of transmitted page data (the number of pages). The printer driver determines whether stapling has been selected with the button B6 on the screen shown in FIG. 3. If stapling has been selected, the printer driver determines whether the number of sheets for recording the transmitted page data exceeds a maximum acceptable number set in the stapler (step S212). If the number of sheets does not exceed the maximum (no in step S212), the process returns to step S206, where bitmap data of a next page to be printed is generated. Then, the generated bitmap data is transmitted to the image forming apparatus 2 (step S207). In step S212, the printer driver determines whether the number of sheets for recording the transmitted page data exceeds the maximum acceptable number set in the stapler, based on the number of pieces of transmitted page data and whether the setting is done so as to perform single-sided or duplex printing. For example, assume that the maximum acceptable number of the stapler is twenty, and that twenty-one pages of data to be printed on one side of each sheet are transmitted to the printer. In this case, the number of recording sheets to be output is twenty-one.

Therefore, the printer driver determines that the number of sheets exceeds the maximum acceptable number of the stapler upon transmitting twenty-one pages of data. However, if duplex printing is selected, two pieces of page data are printed on one sheet, and thus the number of recording sheets required for printing the twenty-one pages is eleven. In this case, the printer driver determines that the number of sheets does not exceed the maximum acceptable number of the stapler.

On the other hand, if the printer driver determines in step S212 that the bitmap data to be generated exceeds the maximum acceptable number of the stapler 3, which is connected to the image forming apparatus 2, the process proceeds to step S213.

In step S213, a display function provided in the printer driver displays, on the display device 105, a warning message indicating that the stapler 3 connected to the image forming apparatus 2 cannot staple printed sheets because there are too many sheets.

Figure 5:
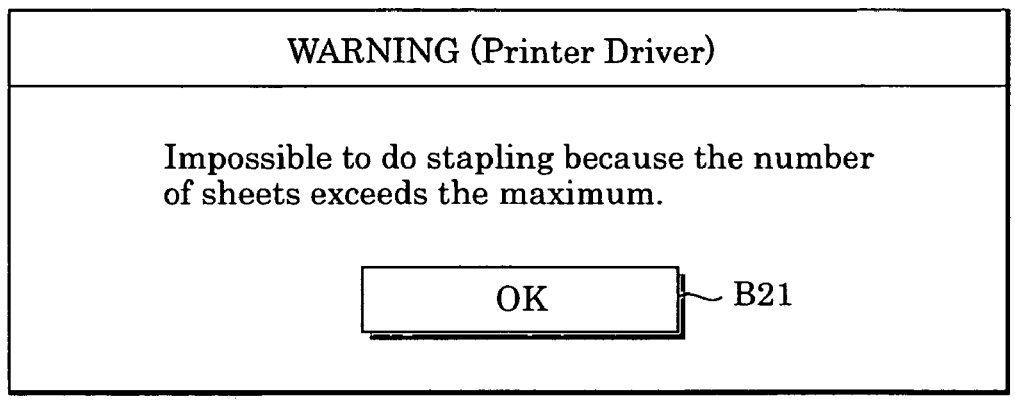
FIG. 5 shows an example of a warning message displayed on the display device shown in FIG. 1.

FIG. 5 shows an example of a warning message displayed on the display device 105 shown in FIG. 1. This warning message corresponds to a message displayed by the printer driver in step S213 in FIG. 2.

The user can know that the number of sheets to be printed exceeds the maximum acceptable number of the stapler by seeing this message. Then, when the user pushes an OK button B21, another screen is displayed on the display device 105 so that the user can select a process to be performed by the printer driver (S213).

Figure 6:
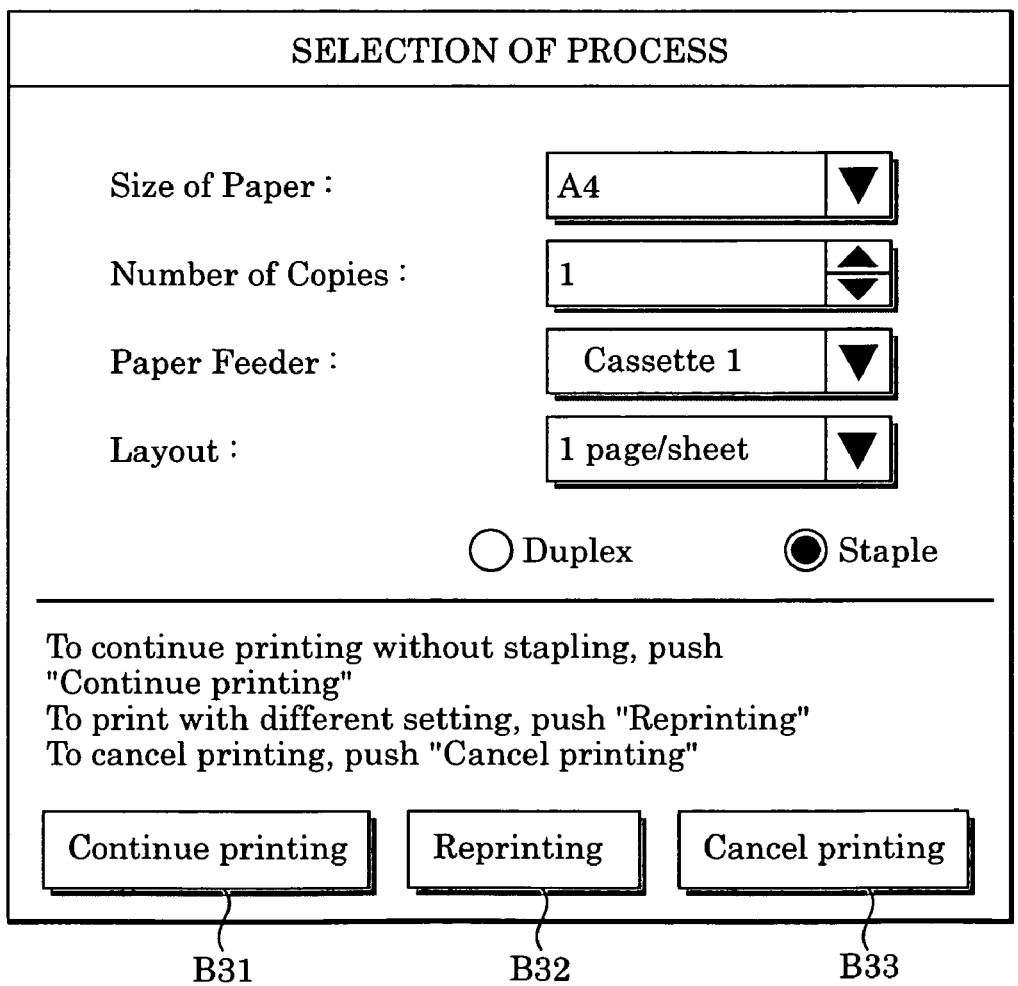
FIG. 6 shows an example of a process selecting screen displayed on the display device shown in FIG. 1.

FIGS. 6 and 7 show examples of a process selecting screen displayed on the display device 105 shown in FIG. 1. This screen appears after the user has pushed the OK button B21 on the warning message screen shown in FIG. 5 by operating the pointing device 112.

In FIGS. 6 and 7, a continue printing button B31 is pushed when the user wants to continue printing regardless of the warning message. In this case, the printer driver controls the subsequent process so that data is printed without being stapled. Specifically, the printer driver transmits a command for invalidating the staple setting.

A reprinting button B32 is pushed when the user wants to perform a printing process again from the start. Specifically, settings are changed so that the number of output sheets does not exceed the maximum acceptable number set in the stapler. For example, a greater number of pages are laid on one recording sheet by changing the layout so as to reduce the sheets to be output. Accordingly, the printer driver controls the subsequent process so that the data is printed with being stapled.

A cancel printing button B33 is pushed when the user wants to abandon the generated bitmap data and cancel the printing process in accordance with the warning message displayed on the display device 105 in step S213. Accordingly, the printer driver controls the subsequent process including abandonment of the bitmap data.

The screen of the warning message and the screen for selecting a process may be independently displayed as shown in FIGS. 5 and 6. Alternatively, as shown in FIG. 7, the screen for selecting a process may include the warning message so as to reduce a control load of the display. When the screen for selecting a subsequent process shown in FIG. 6 or the like is displayed on the display device 105, the user selects a process and the printer driver determines the selection made by the user in step S214. For example, when the user wants to continue printing by canceling stapling, the user pushes the continue printing button B31 in the selecting screen. In this case, the process by the printer driver proceeds to step S215, where stapling is canceled. Then, the process returns to step S206 to continue printing.

When the user wants to change the print settings and to perform a printing operation from the start in step S214, the user sets print conditions again on the screen shown in FIG. 7, which is displayed on the display device 105, and then pushes the reprinting button B32. For example, if the layout is set to 1 page/sheet (one page of print data is printed on one side of a sheet), the user may change the layout to 2 pages/sheet (two pages of print data are printed on one side of a sheet). With this setting, the number of necessary recording sheets can be reduced by almost half. Alternatively, by changing the setting from single-sided printing to duplex printing by pushing the duplex button B7, the number of recording sheets can be reduced by almost half.

Then, the process by the printer driver proceeds to step S216, where the printer driver transmits an offline command to the image forming apparatus 2, so that the host computer 1 is once disconnected to the image forming apparatus 2. Then, the process returns to step S204 to perform a printing process again with the new settings. If the user wants to cancel printing in step S214, he/she pushes the cancel printing button B33 on the selecting screen shown in FIG. 7, which is displayed on the display device 105. The cancel printing button B33 is provided as well as the other buttons B31 and B32 as shown in FIGS. 6 and 7 so that the user can change the print data in order to reduce the number of sheets to be printed.

If the cancel printing button B33 is pushed, the process by the printer driver proceeds to step S217, where the printer driver transmits an offline command to the image forming apparatus 2 in order to disconnect the host computer 1 and the image forming apparatus 2. Then, the process is ended.

As described above, according to the first embodiment, when the printer driver determines that the number of sheets for recording the generated bitmap data exceeds the maximum acceptable number set in the stapler, the printer driver notifies the user of that fact in an interactive manner. By receiving the notification, the user can adequately select a subsequent process from among continue printing, reprinting, and cancel printing.

Further, the process is stopped when the printer driver determines that the number of sheets for recording the generated bitmap data exceeds the maximum acceptable number set in the stapler, and the printer driver requests that the user select a subsequent process. Therefore, waste of print output can be minimized even if the user selects reprinting or cancel printing.

<Second Embodiment>

In the first embodiment, the printer driver performs in parallel a process of converting data to be printed, such as application data, to bitmap data and a process of transmitting the converted bitmap data to the image forming apparatus 2. During these processes, the printer driver counts the number of pieces of transmitted bitmap data (page data). Then, when the number of sheets for recording the generated bitmap data exceeds the maximum acceptable number set in the stapler, the printer driver displays the warning message shown in FIG. 5 on the display device 105 and allows the user to select a subsequent process from among continue printing, reprinting, and cancel printing. In response to the user's selection, the printer driver performs the subsequent process. However, instead of performing in parallel the process of converting print data to bitmap data and the process of transmitting the bitmap data to the image forming apparatus 2, the printer driver may start transmission of bitmap data to the image forming apparatus 2 after converting entire print data to bitmap data. This case is described next as a second embodiment.

Figure 8:
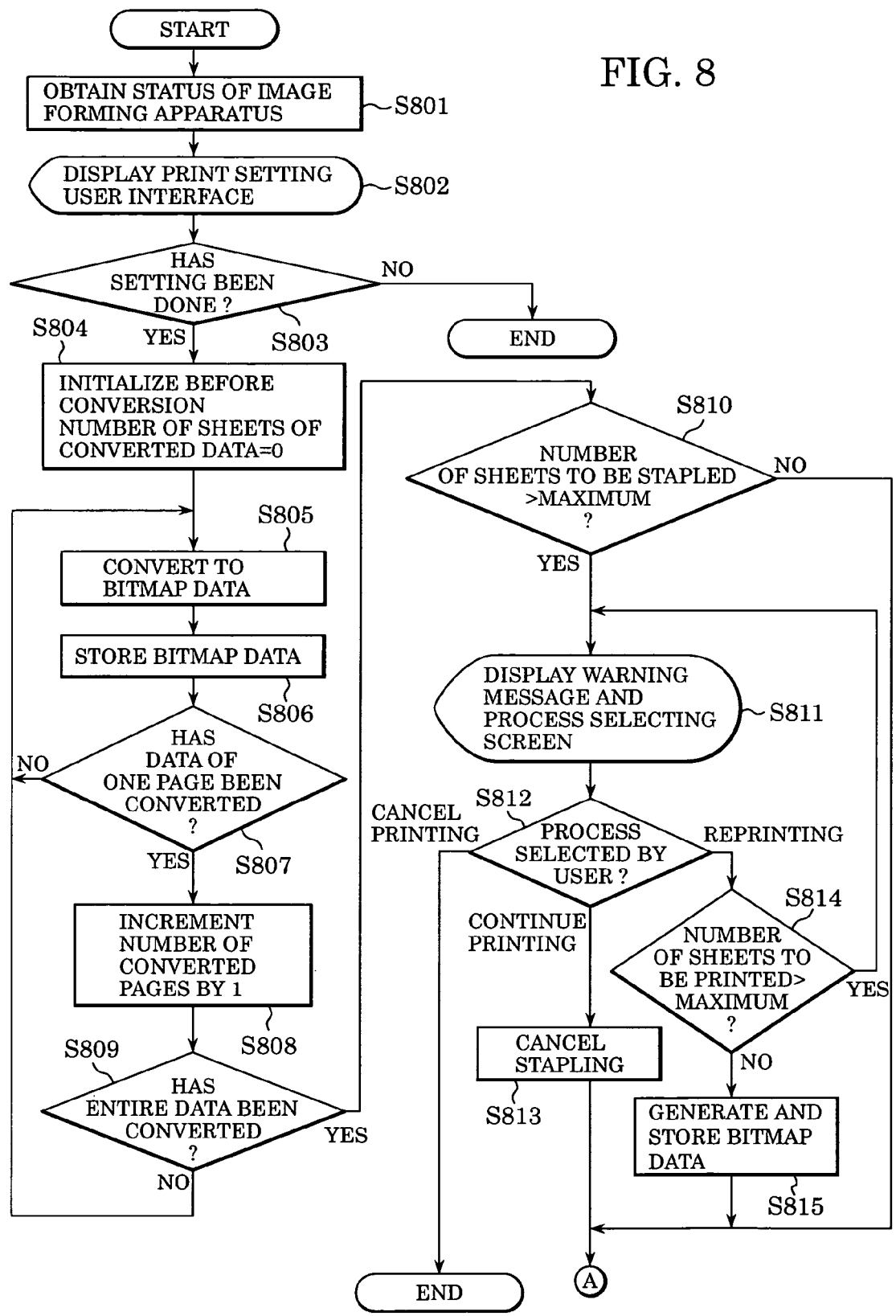
FIGS. 8-9 are a flowchart showing an example of another data processing procedure performed in the information processing apparatus of the present invention.
Figure 9:
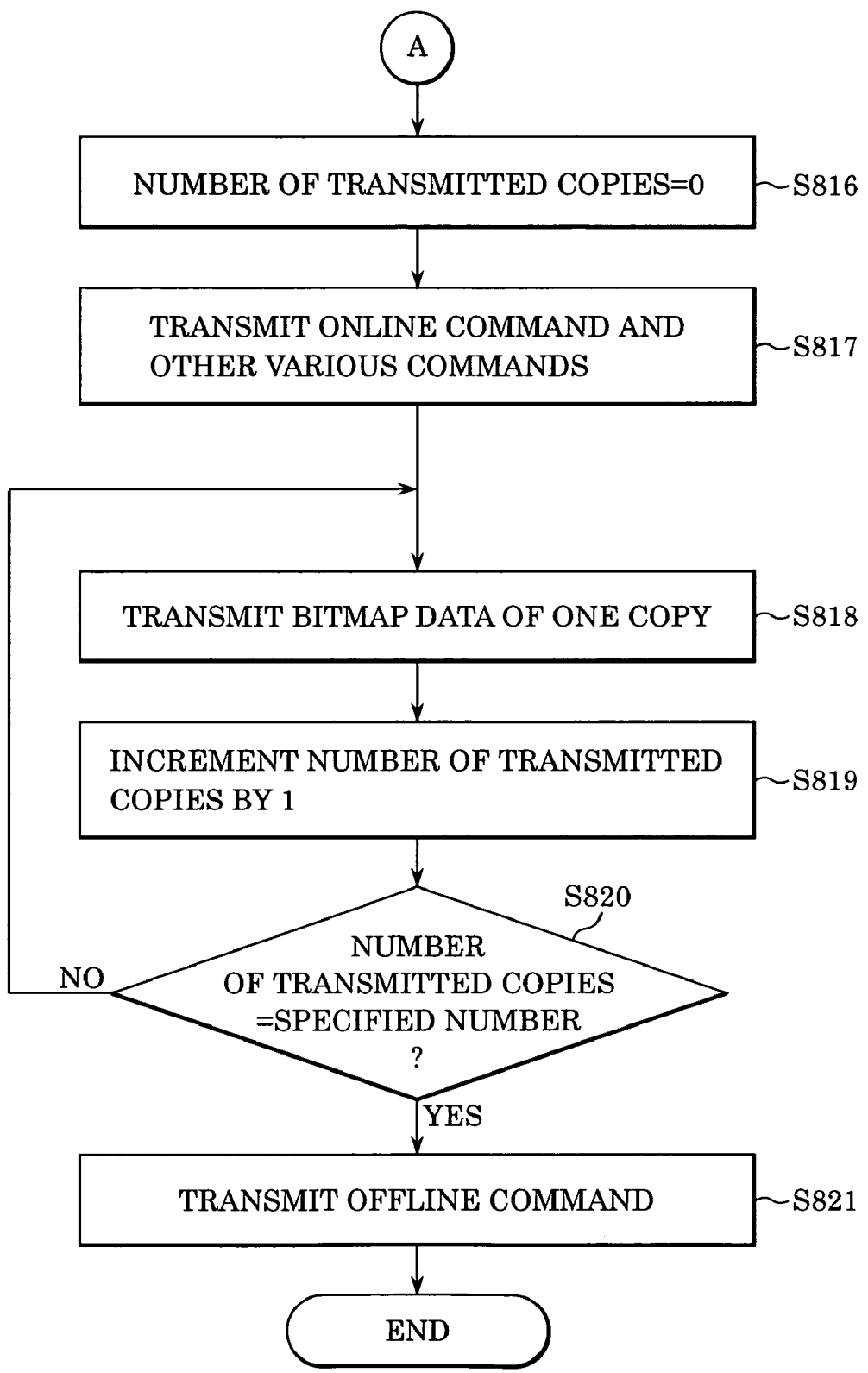

FIGS. 8 and 9 show a flowchart showing an example of a second data processing procedure performed in the information processing apparatus according to the present invention. The flowchart shown in these figures corresponds to a data processing procedure performed by the printer driver and stored in the external storage device 106 shown in FIG. 1.

After the printer driver has started, the printer driver obtains a status of the image forming apparatus 2 and resources information (including information about the stapler 3, information indicating whether the stapler 3 can operate, and an upper limit (maximum acceptable number) of recording sheets of paper that can be stapled) through the printer I/F unit 107, and stores the obtained information in a storage area (step S801). The printer driver controls the display device controller 104 to allow the display device 105 to display a screen on which a user sets print conditions, while considering the status of the image forming apparatus 2 (step S802). Then, the user sets print conditions on this screen (step S803).

The status of the image forming apparatus 2 should be obtained and stored upon starting the printer driver to execute printing so that a latest status can be obtained. However, the present invention is not necessarily limited by timing of obtaining the status of the image forming apparatus 2.

In the above description, the printer driver obtains the status of the image forming apparatus 2 by communicating therewith. Alternatively, the user may set the status to the printer driver, and the printer driver may store the status.

The print setting user interface of this embodiment is the same as that shown in FIG. 3. The user can set print conditions by operating the keyboard 111 and the pointing device 112 as in the first embodiment.

If the user wants to cancel printing while setting print conditions, he/she can do it by pushing the cancel button CB on the setting user interface shown in FIG. 3. With this operation, the operating system of the host computer hides the setting user interface of the printer driver (no in step S803) so as to end the process.

If the user wants to start printing after setting print conditions, he/she pushes the OK button B5 on the setting user interface shown in FIG. 3. Accordingly, the process proceeds to step S804, where the printer driver starts the following printing process.

After the printer driver has started the printing process, the printer driver sets a variable which indicates the number of sheets for recording bitmap data and which is stored in the main storage unit 102 to 0 (zero) and initializes other parameters (step S804). Then, the printer driver converts print data, such as data created by an application, to bitmap data to be printed on one side of a recording sheet in accordance with the print conditions set by the user on the print setting user interface shown in FIG. 3 (step S805) and writes the bitmap data in the main storage unit 102 or the external storage unit 106 so as to store (spool) it (step S806).

For example, if the layout is set to 2 pages/sheet, print data of two pages is converted to bitmap data of one side of a recording sheet.

Then, in step S807, it is determined whether conversion to bitmap data for one side of a recording sheet has completed. If the printer driver determines that bitmap data for one side of a recording sheet (a piece of page data) has not been generated, the process returns to step S805.

On the other hand, if the printer driver determines in step S807 that bitmap data for one side of a recording sheet has been generated, the printer driver increments the variable that indicates the number of pieces of page data which is stored in the main storage unit 102 (step S808). Then, the printer driver determines whether all of the print data to be printed has been converted to bitmap data (step S809). If the printer driver determines that the all of the print data has not been converted to bitmap data, the process returns to step S805 to repeat the processing.

On the other hand, if the printer driver determines in step S809 that all of the data to be printed has been converted to bitmap data, the process proceeds to step S810. The printer driver determines whether stapling is selected on the setting user interface. If stapling is selected, the printer driver determines whether the number of sheets for recording the pieces of page data converted to the bitmap data exceeds the maximum acceptable number of the stapler 3 (step S810).

In step S810, the printer driver determines whether the number of sheets for recording the stored bitmap data exceeds the maximum acceptable number of the stapler 3 in accordance with the number of pieces of stored page data and which of single-sided printing and duplex printing is selected.

If the printer driver determines that the number of sheets to be stapled does not exceed the maximum acceptable number, the process proceeds to step S816 (FIG. 9), where the printer driver sets a variable which indicates the number of transmitted copies which is stored in the main storage unit 102 to 0 (zero) in order to start transmission of the stored bitmap data to the image forming apparatus 2. Then, in step S817, the printer driver transmits an online command to the image forming apparatus 2 in order to establish a connection between the host computer 1 and the image forming apparatus 2 and also transmits various commands including a command of stapling to the image forming apparatus 2.

Then, the printer driver sequentially transmits pieces of the bitmap data stored in the main storage unit 102 or the external storage unit 106 to the image forming apparatus 2 (step S818). Then, the printer driver increments a variable which indicates the number of transmitted copies which is stored in the main storage unit 102 by 1 (step S819).

Then, the printer driver determines whether the number of copies transmitted to the image forming apparatus 2 has reached the number which was specified by the user on the print setting user interface (step S820). If the printer driver determines that the number of transmitted copies has not reached the specified number, the process returns to step S818 so as to repeat the same steps until reaching the specified number. On the other hand, if the printer driver determines that the number of copies transmitted to the image forming apparatus 2 has reached the specified number, the printer driver transmits an offline command to the image forming apparatus 2 (step S821) in order to disconnect the host computer 1 and the image forming apparatus 2 so as to end the process.

On the other hand, in step S810, if the printer driver determines that stapling is selected and that the number of recording sheets obtained based on the variable which indicates the number of pieces of page data as bitmap data and which is stored in the main storage unit 102 exceeds the maximum acceptable number of the stapler 3, the process proceeds to step S811.

In step S811, the printer driver displays a warning message on the display device 105, such as is shown in FIG. 5. The message indicates that stapling is impossible because there are too many sheets to be printed. Also, the printer driver displays the screen shown in FIG. 6 or 7 for allowing the user to select a subsequent process.

On the screen shown in FIG. 6 or 7 for selecting a process, if the user pushes the continue printing button B31 to cancel stapling and continue printing, the process proceeds from step S812 to S813, where the setting of stapling is canceled. Then, the process proceeds to step S816, where the printer driver starts to transmit the stored bitmap data to the image forming apparatus 2, as described above.

On the other hand, when the screen for selecting a process is displayed in step S811, if the user changes the print settings and then pushes the reprinting button B32, processing proceeds from step S812 to step S814 and the printer driver calculates the number of sheets to be printed based on the new settings and determines whether the number of sheets exceeds the maximum acceptable number of the stapler 3.

If the printer driver determines in step S814 that the number of sheets to be printed exceeds the maximum acceptable number of the stapler 3, the process returns to step S811, where the screen shown in FIG. 6 or 7 for selecting a process is displayed on the display device 105.

If the printer driver determines in step S814 that the number of sheets to be printed does not exceed the maximum acceptable number of the stapler 3, the printer driver generates bitmap data based on the new settings and stores the bitmap data in the main storage unit 102 or the external storage unit 106 (step S815). Then, the process proceeds to step S816, where the printer driver starts to transmit the stored bitmap data to the image forming apparatus 2 as described above.

On the other hand, if it is determined in step S812 that the user wants to cancel printing when the screen shown in FIG. 6 or 7 for selecting a process is displayed, the user pushes the cancel printing button B33. In response to this operation, the printer driver ends the process.

The cancel printing button B33 is provided so that the user can re-edit print data to reduce the number of sheets to be printed.

As described above, according to the second embodiment, the printer driver starts to transmit bitmap data to the image forming apparatus 2 after converting all of the print data to bitmap data. Therefore, even if the user sets stapling for a print output that exceeds the maximum acceptable number of the stapler, no sheets will be output (output of several sheets may occur in the printing process according to the first embodiment). This is profitable in view of saving printing resources.

<Third Embodiment>

In the second embodiment, if stapling is set for a print output that exceeds the maximum acceptable number of the stapler, the user can change a layout setting with his/her own idea so that the number of sheets to be printed does not exceed the maximum acceptable number of the stapler 3. However, there are many users who are not familiar with setting a layout. For these users, the printer driver may present a print setting which enables reprinting to the user when the printer driver determines that the number of sheets to be printed exceeds the maximum. This case is described next as a third embodiment.

Figure 10:
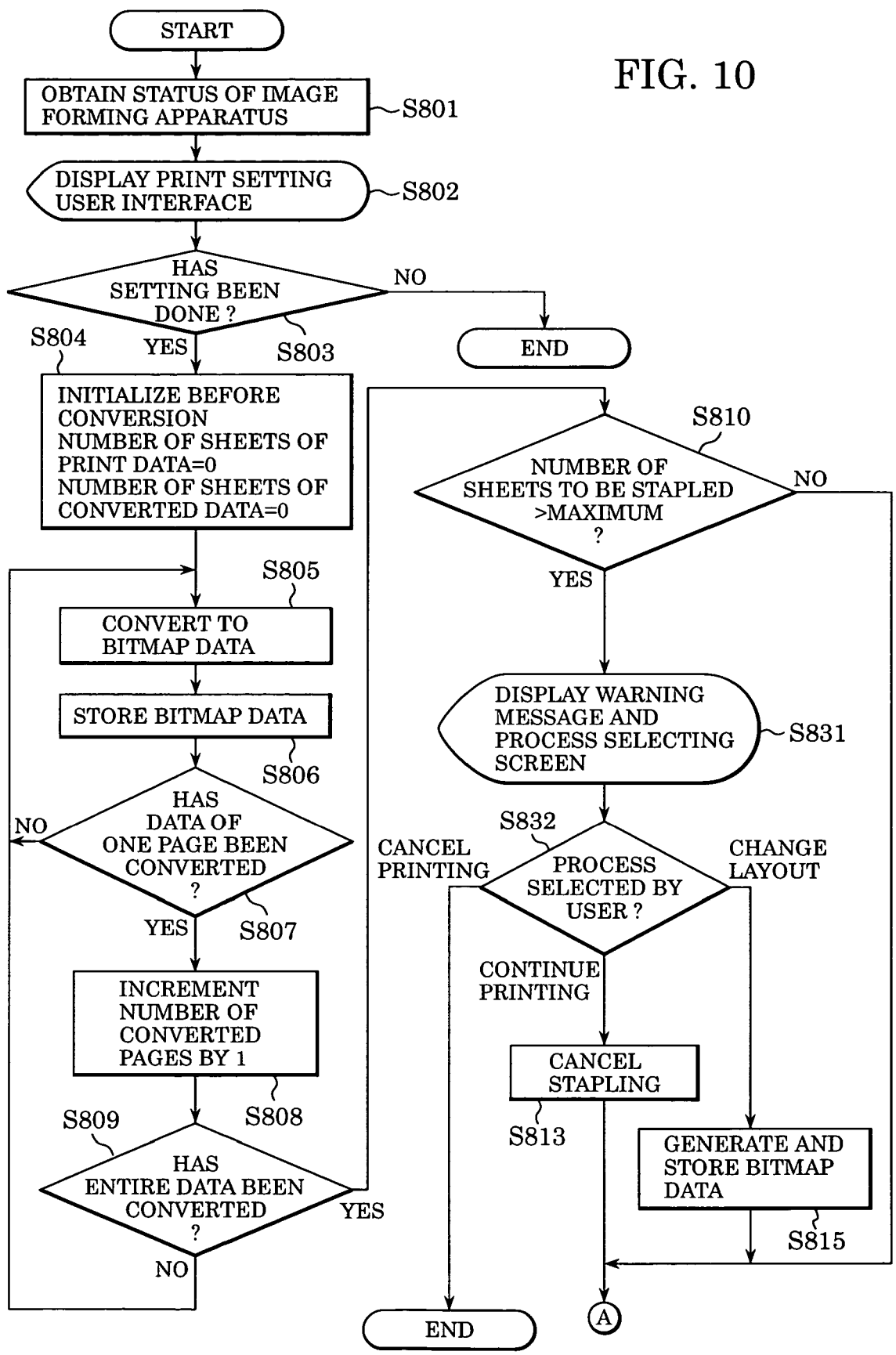
FIGS. 10-11 are a flowchart showing an example of another data processing procedure performed in the information processing apparatus of the present invention.
Figure 11:
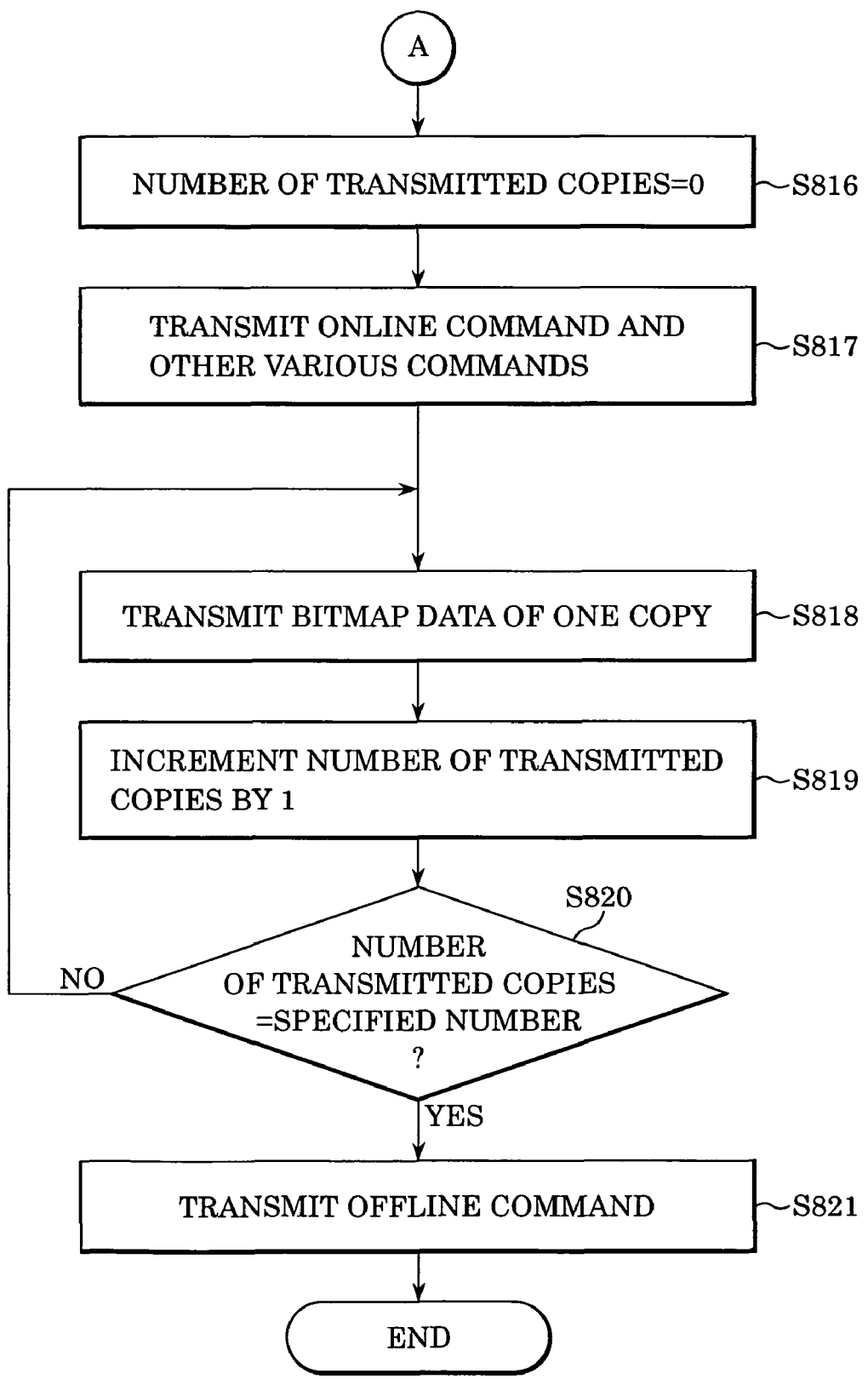

FIGS. 10 and 11 show a flowchart showing an example of a third data processing procedure performed in the information processing apparatus according to the present invention. The flowcharts shown in these figures corresponds a data processing procedure which is performed by the printer driver and which is stored in the external storage apparatus 106 shown in FIG. 1. The steps except steps S831 and S832 (which correspond to steps S811 and S812 in the second embodiment) are the same as those in the second embodiment. Hereinafter, only characteristic steps of the third embodiment (steps of presenting layout settings for enabling the number of printed sheets to be under the maximum acceptable number and allowing the user to select one of the settings) are described.

As described above, this embodiment is the same as the second embodiment in the process from the start to the step of converting the print data to bitmap data. If stapling is not selected or if the number of sheets to be printed obtained based on the number of pieces of page data converted to bitmap data and print settings does not exceed the maximum acceptable number set in the stapler 3, the printer driver starts to transmit the stored bitmap data to the image forming apparatus 2 as in the second embodiment.

On the other hand, if the printer driver determines in step S810 that stapling is selected and that the number of sheets to be printed obtained based on the number of pages of bitmap data and the print settings exceeds the maximum acceptable number set in the stapler 3, the process proceeds to step S831, where the screen shown in FIG. 12 is displayed.

FIG. 12 shows an example of a screen for selecting a process displayed on the display device 105 shown in FIG. 1. In FIG. 12, elements which are the same as those in FIG. 7 are denoted by the same reference numerals. Note that, the printer driver calculates the number of recording sheets to be printed based on the number of pieces of bitmap data (page data) generated from print data and a print setting of single-sided printing or duplex printing. Then, the printer driver presents layout settings that enable the stapler to staple the printed sheets and allows the user to select one of the settings.

Specifically, as can be seen in the example shown in FIG. 12, the print condition is currently set to 1 page/sheet (single-sided printing) in "Current setting". Under this setting, the printer driver determines that the number of sheets to be output exceeds the maximum acceptable number of the stapler 3, and performs the following process.

The printer driver calculates the number of recording sheets to be printed based on the number of pages of logical page data and the various print layouts. Based on the calculation result, the printer driver visually presents setting conditions that make stapling impossible to the user. For example, "2 pages/sheet (single-sided)" and "1 page/side (duplex)", which cause output of too many sheets to staple, are displayed in a light color. Such a display manner notifies the user that the number of sheets to be printed exceeds the maximum acceptable number of the stapler even if the user changes the layout setting to single-sided printing with two pages laid on one side of a sheet or duplex printing with one page laid on each side of a sheet (that is, setting of printing two pages on one recording sheet). The items displayed in a light color cannot be selected. A method for notifying the user is not limited to the above-described method.

Conditions that can be selected (e.g., "4 pages/sheet (single-sided)" and "2 pages/side (duplex)") are displayed in a normal color. By selecting one of the available (normally displayed) selections, the printed sheets can be stapled.

The user can select an item displayed in a normal color by clicking a portion of a character of the item or a corresponding circle (by moving a cursor to a target portion by the pointing device 112, pushing a button on the pointing device 112, and releasing the button). With this operation, the circle corresponding to the selected item is blackened and the circle corresponding to the previously selected item becomes white. Accordingly, the user can visually understand that a new setting has been selected.

By pushing a change layout button B32 in this process selecting screen, the process proceeds from step S832 to S815, where bitmap data is generated again while specifying the number of printed sheets that can be stapled, and the generated bitmap data is stored. Then, transmission of the stored bitmap data to the image forming apparatus 2 is started.

Referring to FIG. 12, a process performed when the user pushes the continue printing button B31 and a process performed when the user pushes the cancel printing button B33 are the same as in the second embodiment.

As described above, according to the third embodiment, when stapling cannot be performed in a current setting, various layout settings that enable stapling are presented to the user, so that the user can select one of them. Accordingly, the user can change print settings very easily and the usability is enhanced.

<Fourth Embodiment>

In the first embodiment, print data is transmitted to the image forming apparatus 2 while being converted to bitmap data in a process of transferring the print data. In the second embodiment, bitmap data is transmitted to the image forming apparatus 2 after entire print data has been converted to bitmap data. A user may select one of these transfer methods. This case is described next as a fourth embodiment.

Figure 13:
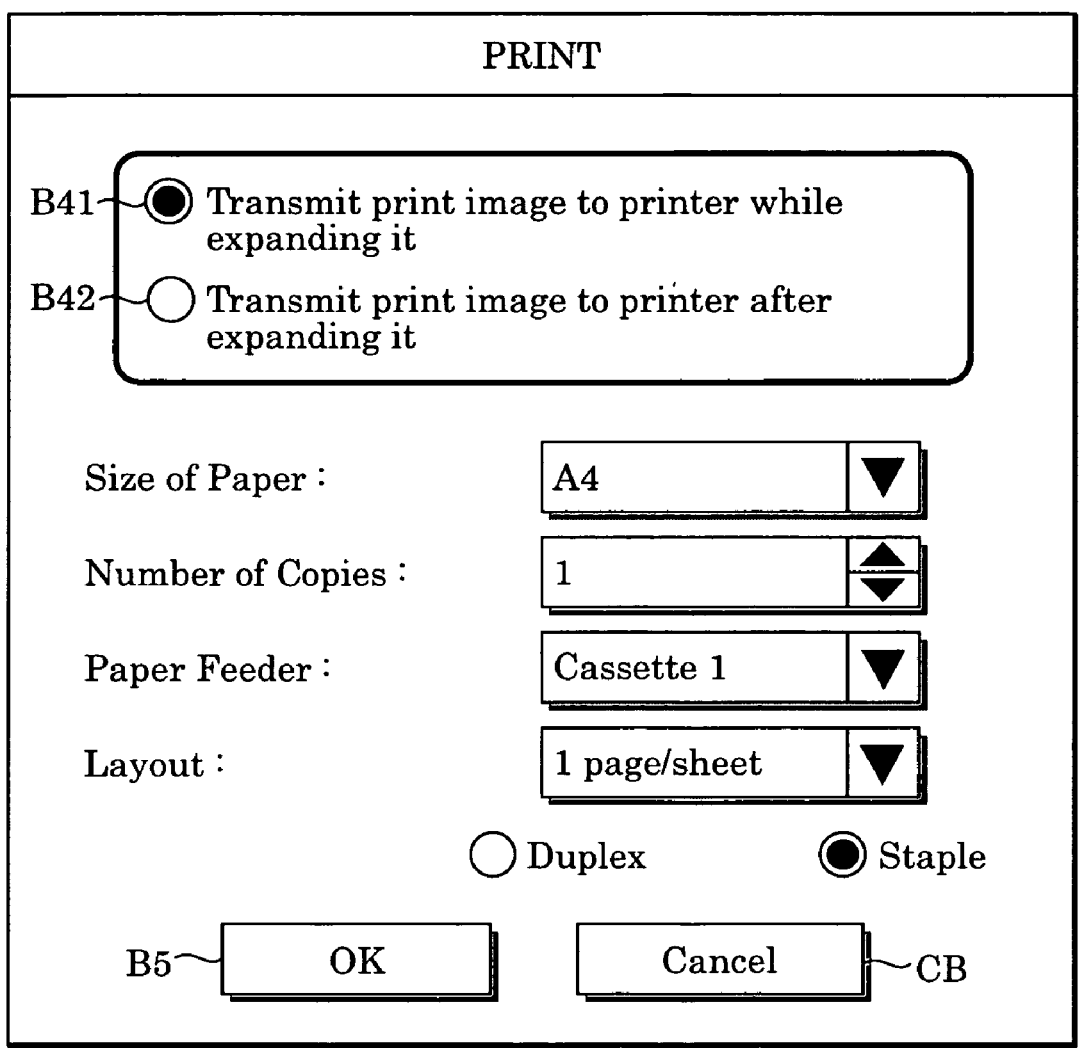
FIG. 13 shows an example of a print setting user interface.

FIG. 13 shows an example of a print setting user interface displayed in the information processing apparatus according to the fourth embodiment. This print setting user interface is displayed on the display device 105 by the printer driver.

In FIG. 13, print data transmission selecting buttons B41 and B42 are provided on the screen. The print data transmission selecting button B41 is pushed by the user when the user wants to select "Transmit print image to printer while expanding it". On the other hand, the print data transmission selecting button B42 is pushed by the user when the user wants to select "Transmit print image to printer after expanding it". These buttons B41 and B42 can be exclusively selected by the user (i.e., selection of one button unselects other button).

In the print setting user interface configured in the above-described manner, when "Transmit print image to printer while expanding it" is selected, that is, when the print data transmission selecting button B41 is pushed, the printer driver transmits print data to the image forming apparatus 2 while converting the print data to bitmap data, as described in the first embodiment.

On the other hand, when "Transmit print image to printer after expanding it" is selected, that is, when the print data transmission selecting button B42 is pushed on the print setting user interface shown in FIG. 13, the printer driver transmits print data to the image forming apparatus 2 after converting the entire print data to bitmap data, as described in the second or third embodiment.

Figure 14:
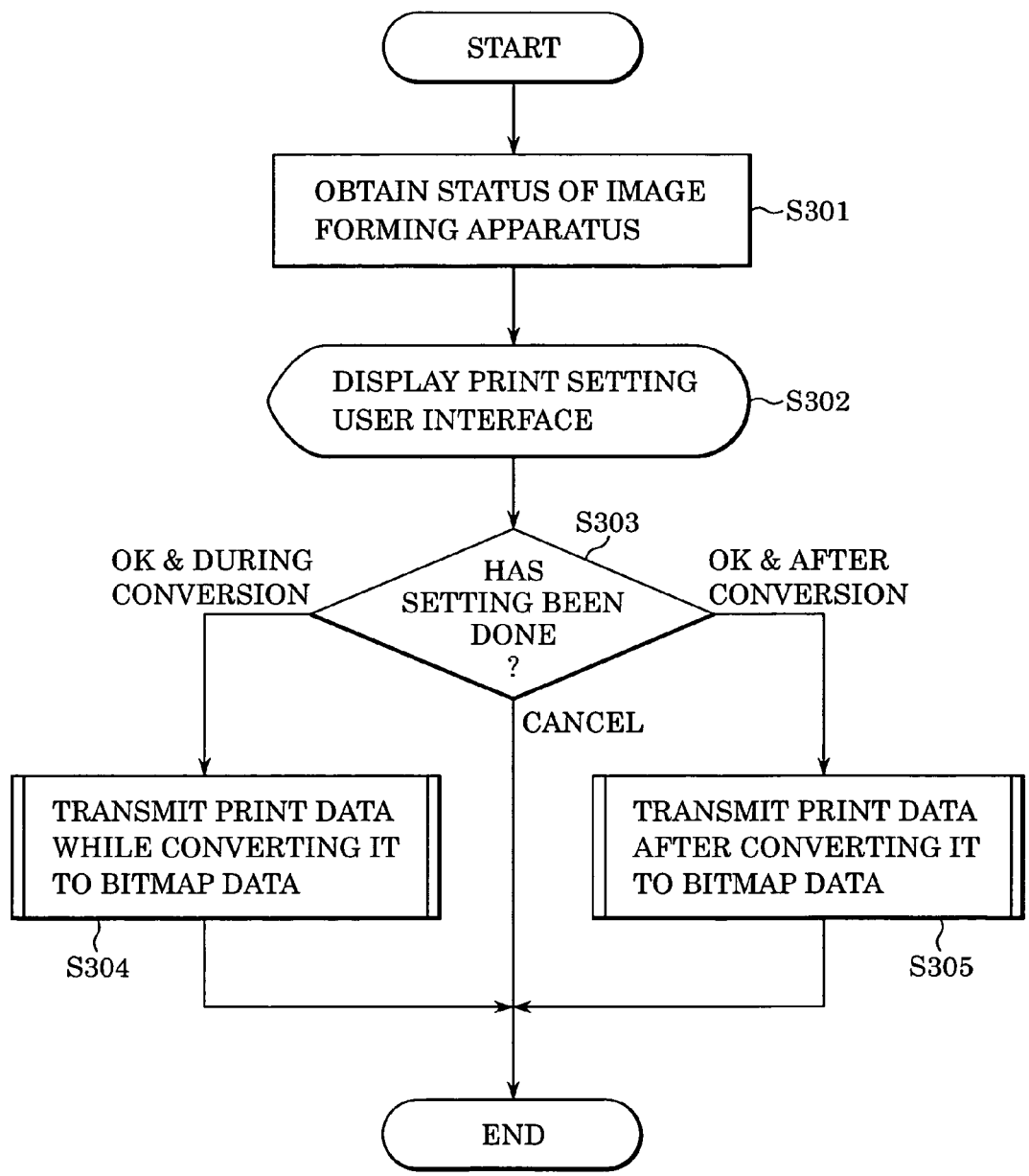
FIG. 14 is a flowchart showing an example of another data processing procedure performed in the information processing apparatus of the present invention.

FIG. 14 is a flowchart showing an example of a data processing procedure performed in the information processing apparatus according to the present invention. This flowchart corresponds to a data processing procedure which is stored in the external storage unit 106 shown in FIG. 1 and which is performed by the printer driver.

After the printer driver has started, the printer driver obtains a status of the image forming apparatus 2 through the printer I/F 107 (step S301). Then, by considering the status of the image forming apparatus 2, the printer driver controls the display device controller 104 to allow the display device 105 to display the screen shown in FIG. 13 which allows the user to perform print settings (step S302).

Then, the user sets printing conditions (e.g., size of paper, number of copies, paper feeder, layout, and data transmitting method) on the print setting user interface shown in FIG. 13 (step S303).

Then, the printer driver determines the settings input by the user (step S303). If the user wants to cancel printing during the setting operation, he/she pushes the cancel button CB on the setting user interface. Accordingly, the printer driver hides the setting user interface from the display device 105 instead of starting printing, so as to end the process.

If the user completes the setting operation and wants to start printing in step S303, he/she pushes the OK button B5 on the setting user interface shown in FIG. 13. Accordingly, the printer driver starts printing.

Further, in step S303, if "Transmit print image to printer while expanding it" is selected with the print data transmission selecting button B41 on the setting user interface shown in FIG. 13, the process proceeds to step S304, where the print driver transmits print data to the image forming apparatus 2 while converting the print data to bitmap data.

On the other hand, in step S303, if "Transmit print image to printer after expanding it" is selected with the print data transmission selecting button B42 on the setting user interface shown in FIG. 13, the process proceeds to step S305, where the print driver transmits print data to the image forming apparatus 2 after converting the entire print data to bitmap data.

Figure 15:
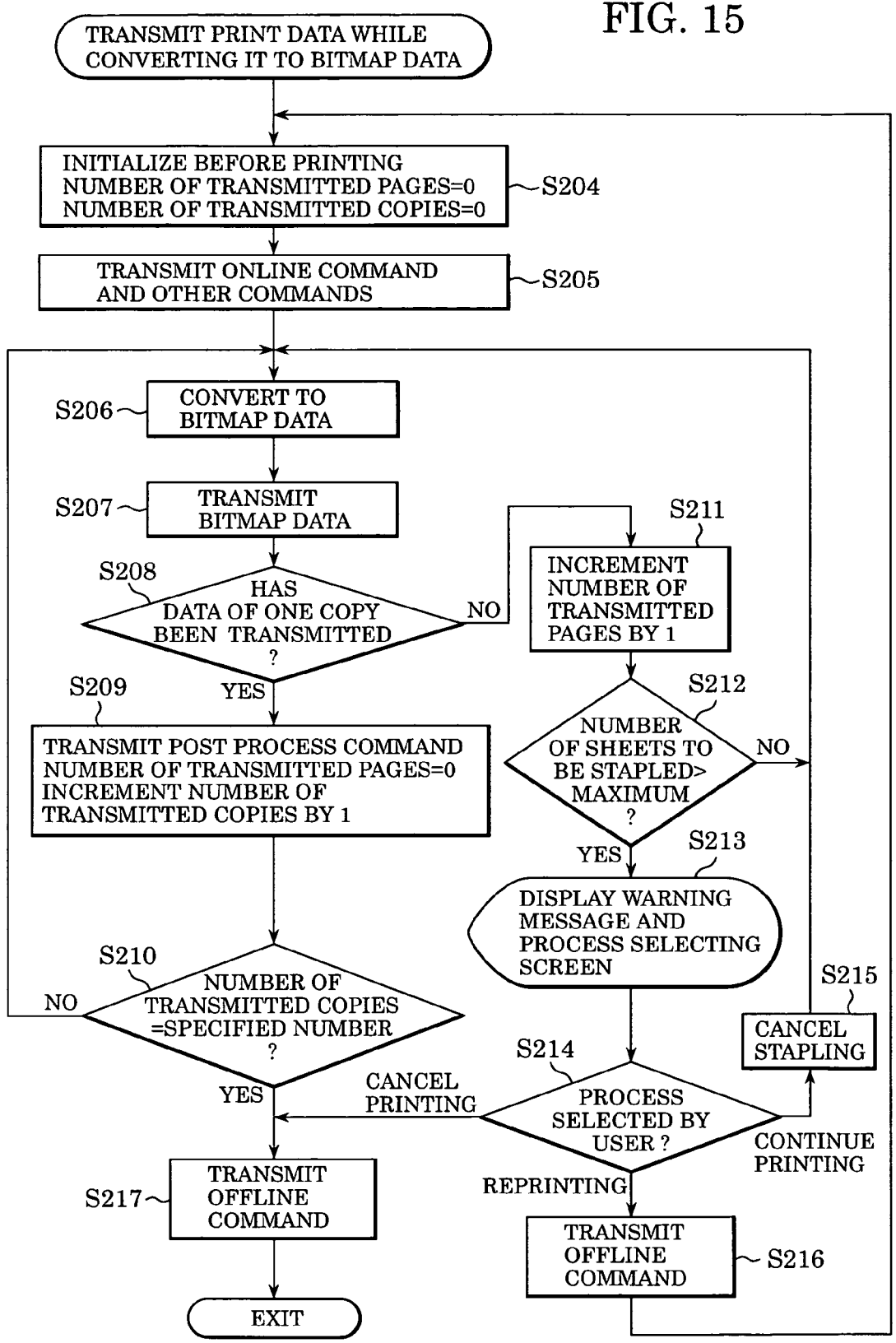
FIG. 15 is a flowchart showing an example of another data processing procedure performed in the information processing apparatus of the present invention.

FIG. 15 is a flowchart showing an example of a data processing procedure performed in the information processing apparatus according to the present invention. The flowchart shown in FIG. 15 corresponds to a data processing procedure which is stored in the external storage unit 106 shown in FIG. 1 and which is performed by the printer driver (step S304 of FIG. 14, "transmits print data while converting it to bitmap data"). In the flowchart shown in FIG. 15, steps equivalent to those in the flowchart of the first embodiment shown in FIG. 2 are denoted by the same step numbers, and the corresponding description will not be repeated here.

Figure 16:
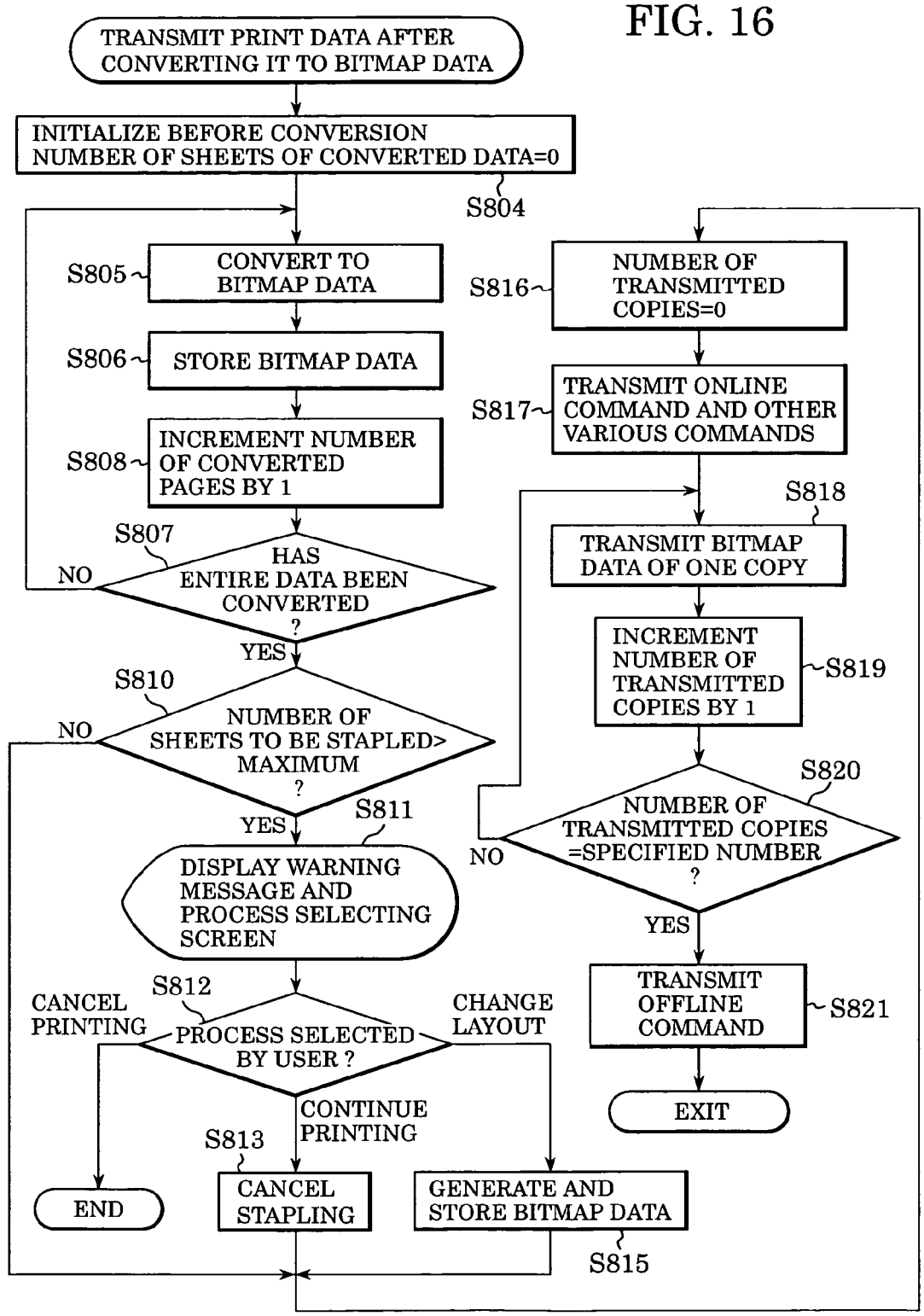
FIG. 16 is a flowchart showing an example of another data processing procedure performed in the information processing apparatus of the present invention.

FIG. 16 is a flowchart showing an example of a data processing procedure performed in the information processing apparatus according to the present invention. The flowchart shown in FIG. 16 corresponds to a data processing procedure which is stored in the external storage unit 106 shown in FIG. 1 and which is performed by the printer driver (step S305 of FIG. 14, "transmits print data after converting it to bitmap data"). In the flowchart, steps equivalent to those in the flowchart of the third embodiment shown in FIGS. 10 and 11 are denoted by the same step numbers, and the corresponding description will not be repeated here.

As described above, according to the fourth embodiment, when the print data is transmitted to the image forming apparatus 2 after the entire print data has been converted to bitmap data, unnecessary print output can be avoided even if stapling is set for print output that exceeds the maximum acceptable number of sheets that can be stapled of the stapler. However, since transmission to the image forming apparatus 2 is started after the entire print data has been converted to bitmap data, throughput of a printing process can decrease.

On the other hand, when the print data is transmitted to the image forming apparatus 2 while being converted to bitmap data, the throughput does not decrease. However, if stapling is set for print output that exceeds the maximum acceptable number of the stapler, unnecessary print output may occur. The user can select one of a process of transmitting print data to the image forming apparatus 2 while converting the print data to bitmap data and a process of transmitting print data to the image forming apparatus 2 after converting the entire print data to bitmap data, so that the user can allow the printer driver to perform a process in accordance with his/her desires.

<Fifth Embodiment>

In the fourth embodiment, the user selects one of a process of transmitting print data while converting the print data to bitmap data and a process of transmitting print data after converting the entire print data to bitmap data under the premise that a stapling operation is to be performed. However, the printer driver may automatically control a process so as to transmit print data to the image forming apparatus 2 while converting the print data to bitmap data when stapling is not selected by the user, and to transmit print data to the image forming apparatus 2 after converting the entire print data to bitmap data as in the second and third embodiments when stapling is selected. This case is described next as a fifth embodiment.

FIG. 17 is a flowchart showing an example of a data processing procedure performed in the information processing apparatus according to the present invention. The flowchart shown in FIG. 17 corresponds to a data processing procedure which is stored in the external storage unit 106 shown in FIG. 1 and which is performed by the printer driver.

After the printer driver has started, the printer driver obtains status information of the image forming apparatus 2 through the printer I/F 107 and stores the status information (step S401). Then, by considering the status of the image forming apparatus 2, the printer driver controls the display device controller 104 to allow the display device 105 to display the screen shown in FIG. 3 allowing the user to set print conditions (step S402). The user sets print conditions on this screen.

In step S403, the printer driver determines the content of the settings. If the user wants to cancel printing during the setting operation, he/she pushes the cancel button CB on the setting user interface. When the printer driver determines that the cancel button CB has been pushed, the printer driver hides the setting user interface without starting printing and ends the process.

On the other hand, when the printer driver determines that the user has completed the print setting and pushed the OK button B5 on the setting user interface shown in FIG. 3 in order to start printing, the printer driver starts printing.

When the printer driver determines that stapling is not selected in step S403, the process proceeds to step S404, where the printer driver transmits print data to the image forming apparatus 2 while converting the print data to bitmap data.

On the other hand, when the printer driver determines that stapling is selected in step S403, the process proceeds to step S405, where the printer driver converts entire print data to bitmap data and then transmits the bitmap data to the image forming apparatus 2.

The process performed in step S404 in FIG. 17, that is, the process of sequentially transmitting pieces of page data which have been converted to bitmap data to the image forming apparatus 2, is the same as the process shown in FIG. 2. Thus, the corresponding description will not be repeated here.

The process performed in step S405 shown in FIG. 17, that is, "transmits print data after converting it to bitmap data" is the same as the corresponding part of FIG. 16, and thus the description thereof will not be repeated here.

As described above, according to the fifth embodiment, if stapling is set to be performed, entire print data is converted to bitmap data and then the bitmap data is transmitted to the image forming apparatus 2. In this method, unnecessary print output can be avoided.

On the other hand, if stapling is not set, pieces of print data are sequentially transmitted to the image forming apparatus 2 while converting them to bitmap data. In this method, a decrease in throughput of the printing process can be prevented.

In the above-described embodiments, stapling is adopted as a predetermined post process performed by the image forming apparatus 2. However, the predetermined post process in the present invention is not limited to stapling. The present invention can also be applied to punching, gluing, folding, and an effective combination of some of these post processes.

Further, in the above-described embodiments, the thickness of a recording medium which can be accepted by the stapler 3, that is, the maximum acceptable number of sheets to be stapled, is set in advance based on the thickness of plain paper. However, when the image forming apparatus 2 can detect or specify the type of recording medium fed therefrom, a problem can occur if the maximum acceptable number is fixed. To prevent this problem, various correcting values may be managed in a table so that the maximum acceptable number of sheets to be stapled can be changed in accordance with the type of selected paper or the like and that the changed setting can be reflected on control of the printer driver.

Further, in the above-described embodiments, bitmap data (page data) is generated based on logical data generated by an application or the like and print settings, and the number of pieces of the page data is counted. However, the present invention is not limited to this method. For example, the number of pieces of page data on which print settings are reflected may be counted before expanding logical data to bitmap data, so that it can be determined whether the number exceeds the maximum acceptable number for a post process.

Now, a configuration of data processing programs which can be read by the information processing apparatus according to the present invention will be described with reference to a memory map shown in FIG. 18.

FIG. 18 shows a memory map of a storage medium storing various data processing programs which can be read by the information processing apparatus according to the present invention.

Although not shown in the figure, information for managing a group of programs stored in the storage medium, e.g., version information and names of creators, may be stored. Further, information depending on an operating system (OS) or the like on the program reading side, e.g., icons for discriminating programs, may be stored.

Further, data belonging to the various programs is managed in the directory. Also, a program for installing various programs into a computer and a program for decompressing a compressed program to be installed may be stored.

The functions illustrated in FIGS. 2, 8, 9, 10, 11, 14, 15, 16, and 17 according to the above-described embodiments may be executed by the host computer in accordance with an externally installed program. In that case, a group of information including the programs may be supplied to an output device from a storage medium such as a CD-ROM (compact disk—read-only memory), a flash memory, and a floppy disk (FD), or from an external storage medium through a network.

The present invention can be realized by supplying a storage medium storing program code of software for realizing the functions of the above-described embodiments to a system or an apparatus so that a computer (or CPU or MPU (microprocessing unit)) of the system or the apparatus reads and executes the program code stored in the storage medium.

In this case, the program code read from the storage medium realizes a new function of the present invention.

Therefore, the form of the program is not specified as long as the program has a program function. For example, object code, a program executed by an interpreter, and script data supplied to an OS may be used.

Examples of the storage medium for supplying the program include a flexible disk, a hard disk, an optical disk, a magneto-optical (MO) disk, a CD-ROM, a CD-R (CD recordable), a CD-RW (CD rewritable), a magnetic tape, a nonvolatile memory card, a ROM, and a DVD (digital versatile disk).

In this case, the program code read from the storage medium realizes the functions of the above-described embodiments.

The program may be supplied by using another method. For example, the program may be supplied by accessing a site on the Internet by using a browser of a client computer and downloading the computer program of the present invention or a compressed file including an automatic install function from the site to a recording medium, such as a hard disk. Alternatively, the program code constituting the program of the present invention may be divided into a plurality of files and the files may be downloaded from different sites. That is, a WWW (world wide web) server, an ftp (file transfer protocol) server, or the like which allows a plurality of users to download a program file for realizing the function of the present invention in a computer is included in the present invention.

Another possible method includes storing the program of the present invention in storage media such as CD-ROMs by encrypting the program and distributing the storage media to users, and allowing users who have satisfied a predetermined condition to download key information for decrypting the encrypted program from a site through the Internet, so that the users can execute the encrypted program by using the key information and install the program into a computer.

The functions of the above-described embodiments may be realized when a computer executes read program code. Also, the functions of the above-described embodiments may be realized when an OS operating in the computer executes part of whole of actual processing based on the instructions of the program code.

Further, after the program code is read from a storage medium, it can be written in a memory provided in a function expanding board inserted into a computer or a function expanding unit connected to a computer. A CPU or the like provided in the function expanding board or the function expanding unit may execute part or whole of actual processing based on the instructions of the program code. Accordingly, the functions of the above-described embodiments can be realized.

Figure 19:
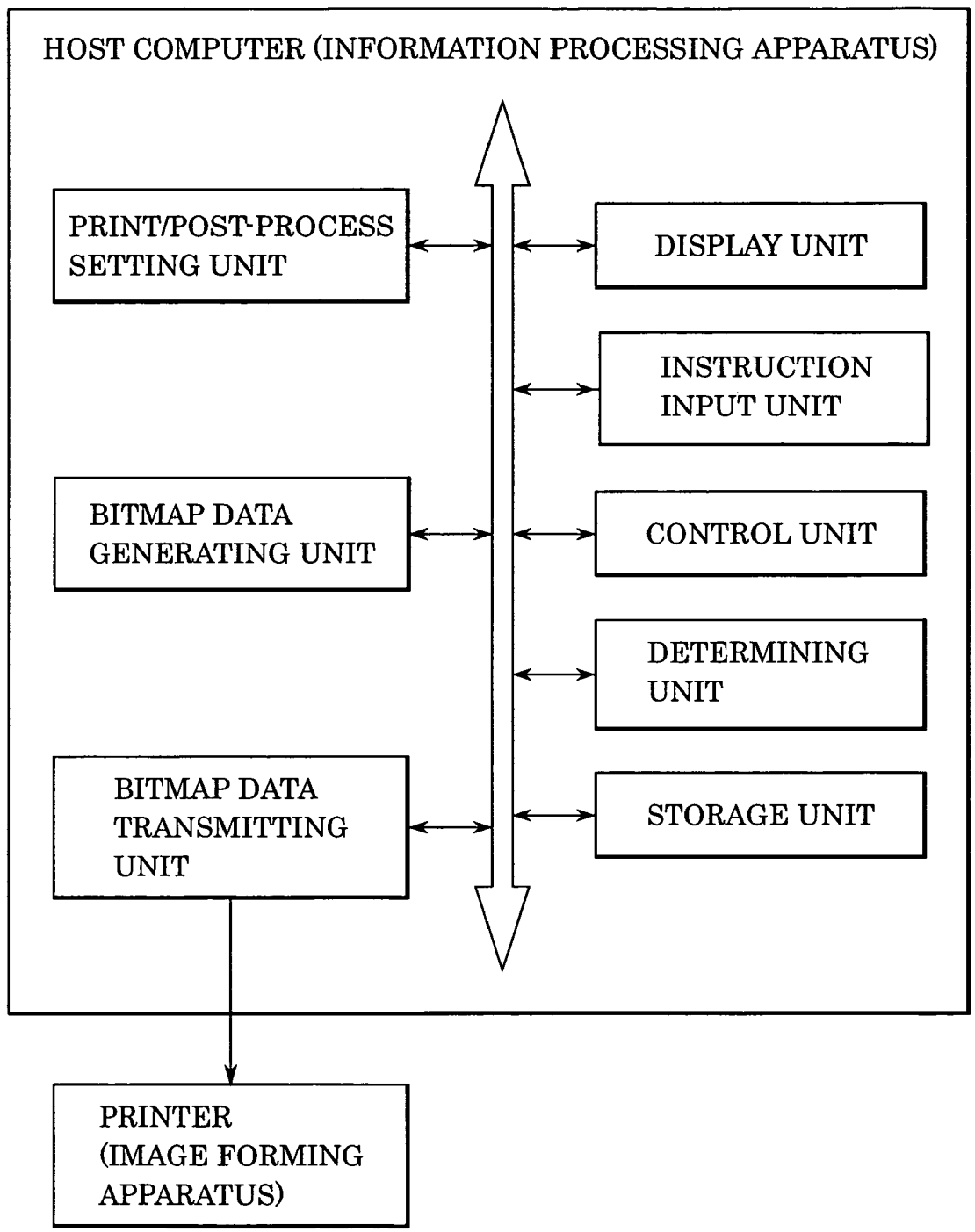
FIG. 19 is a conceptual view showing each module in the information processing apparatus of the present invention.

FIG. 19 is a conceptual view showing various units for executing control according the above-described embodiments. These units may be configured with hardware or may be configured as a program module executing processing of each unit. Also, a combination of hardware and a program module may be used. For example, a control unit and a determining unit correspond to the CPU 101 shown in FIG. 1 and a storage unit corresponds to the main storage unit 102 or the external storage unit 106. Each of a print/post-process setting unit and a bitmap data generating unit is configured as a module in a print control program. The control unit is capable of executing a series of processes described in the above-described embodiments and making determination by adequately operating these modules.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-176467 filed Jun. 15, 2004, which is hereby incorporated by reference herein.

What is claimed is:

1. An information processing apparatus having a CPU and transmitting print data to an image forming apparatus connectable with a post processing apparatus performing a post process including a staple operation on a recording paper on which an image is formed, the information processing apparatus comprising:

a storage unit configured to store a maximum acceptable number of sheets of the recording paper that can be processed by the post processing apparatus;

a post process setting unit configured to set the post process to be performed by the post processing apparatus;

a setting unit capable of setting a number of pages which are laid out on the recording paper;

a determining unit configured to determine whether the post process can be performed for a printed material based on the print data according to a number of sheets of the printed material obtained based on the number of pages set by said setting unit and the print data and the maximum acceptable number stored in the storage unit;

a layout setting candidate evaluating unit configured to evaluate one or more layout settings as candidates for printing of the print data, by calculating a number of sheets used for printing the print data with each of the layout settings, and determining whether each layout setting limits the number of printed sheets to the maximum acceptable number; and a display control unit configured, in a case where the determining unit determines that the post process cannot be performed, to display one or more layout setting candidates that limit a number of sheets of the printed material based on the print data to the maximum acceptable number, and to display one or more layout setting candidates that do not limit the number of sheets of the printed material based on the print data to the maximum acceptable number, wherein the layout setting candidates that do limit the number of sheets to the maximum number are displayed in a manner that is different from a manner in which the layout setting candidates that do not limit the number of sheets to the maximum number are displayed.

2. The information processing apparatus according to claim 1, wherein the display control unit displays the layout setting candidates that do not limit the number of sheets of the printed material based on the print data to the maximum acceptable number in such a manner that the user cannot select the layout setting candidates.

3. The information processing apparatus according to claim 1, wherein the display control unit displays a print button to perform print processing based on the print data without performing the post process and a cancel button to cancel the print processing based on the print data.

4. A data processing method in an information processing apparatus transmitting print data to an image forming apparatus connectable with a post processing apparatus performing a post process including a staple operation on a recording paper on which an image is formed, the data processing method comprising:

a post process setting step of setting the post process to be performed by using the post processing apparatus;

a setting step of setting a number of pages which are laid out on the recording paper;

a determining step of determining whether the post process can be performed for a printed material based on the print data according to a number of sheets of the printed material obtained based on the number of pages set by said setting unit and the print data and a maximum acceptable number of sheets of recording paper that can be processed by the post processing apparatus, the number being stored in a storage unit;

a layout setting candidate evaluating step of evaluating one or more layout settings as candidates for printing of the print data, by calculating a number of sheets used for printing the print data with each of the layout settings, and determining whether each layout setting limits the number of printed sheets to the maximum acceptable number; and a display control step of, in a case where it is determined in the determining step that the post process cannot be performed, displaying one or more layout setting candidates that limit a number of sheets of the printed material based on the print data to the maximum acceptable number, and displaying one or more layout setting candidates that do not limit the number of sheets of the printed material based on the print data to the maximum acceptable number, wherein the layout setting candidates that do limit the number of sheets to the maximum number are displayed in a manner that is different from a manner in which the layout setting candidates that do not limit the number of sheets to the maximum number are displayed.

5. The data processing method of claim 4, wherein in the display control step, the layout setting candidates that do not limit the number of sheets of the printed material based on the print data to the maximum acceptable number are displayed in such a manner that the user cannot select the layout setting candidates.

6. The data processing method of claim 4, wherein in the display control step, a print button is displayed to perform print processing based on the print data without performing the post process and a cancel button is displayed to cancel the print processing based on the print data.

7. A non-transitory computer readable storage medium having stored thereon a print control program which allows a computer to execute a data processing method in an information processing apparatus transmitting print data to an image forming apparatus connectable with a post processing apparatus performing a post process including a staple operation on a recording paper on which an image is formed, the data processing method comprising:

a post process setting step of setting the post process to be performed by using the post processing apparatus;

a setting step of setting a number of pages which are laid out on the recording paper;

a determining step of determining whether the post process can be performed for a printed material based on the print data according to a number of sheets of the printed material obtained based on the number of pages set by said setting unit and the print data and a maximum acceptable number of sheets of recording paper that can be processed by the post processing apparatus, the number being stored in a storage unit;

a layout setting candidate evaluating step of evaluating one or more layout settings as candidates for printing of the print data, by calculating a number of sheets used for printing the print data with each of the layout settings, and determining whether each layout setting limits the number of printed sheets to the maximum acceptable number; and a display control step of, in a case where it is determined in the determining step that the post process cannot be performed, displaying one or more layout setting candidates that limit a number of sheets of the printed material based on the print data to the maximum acceptable number, and displaying one or more layout setting candidates that do not limit the number of sheets of the printed material based on the print data to the maximum acceptable number, wherein the layout setting candidates that do limit the number of sheets to the maximum number are displayed in a manner that is different from a manner in which the layout setting candidates that do not limit the number of sheets to the maximum number are displayed.

8. The non-transitory computer readable storage medium of claim 7, wherein in the display control step, the layout setting candidates that do not limit the number of sheets of the printed material based on the print data to the maximum acceptable number are displayed in such a manner that the user cannot select the layout setting candidates.

9. The non-transitory computer readable storage medium of claims 7, wherein in the display control step, a print button is displayed to perform print processing based on the print data without performing the post process and a cancel button is displayed to cancel the print processing based on the print data.

* * * * *